United States Patent
Mola

(10) Patent No.: US 12,079,105 B2
(45) Date of Patent: *Sep. 3, 2024

(54) CACHE-BASED TRACING FOR TIME TRAVEL DEBUGGING AND ANALYSIS

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 230 days.

This patent is subject to a terminal disclaimer.

(21) Appl. No.: 17/473,627

(22) Filed: Sep. 13, 2021

(65) Prior Publication Data

US 2022/0012162 A1 Jan. 13, 2022

Related U.S. Application Data

(63) Continuation of application No. 16/029,372, filed on Jul. 6, 2018, now Pat. No. 11,138,092, which is a
(Continued)

(51) Int. Cl.
*G06F 11/36* (2006.01)
*G06F 9/54* (2006.01)

(52) U.S. Cl.
CPC .......... *G06F 11/3636* (2013.01); *G06F 9/542* (2013.01)

(58) Field of Classification Search
CPC .............................. G06F 9/542; G06F 11/3636
See application file for complete search history.

(56) References Cited

U.S. PATENT DOCUMENTS

| 4,833,601 A | 5/1989 | Barlow et al. |
| 5,893,155 A | 4/1999 | Cheriton |

(Continued)

FOREIGN PATENT DOCUMENTS

| CN | 1722086 A | 1/2006 |
| CN | 1732433 A | 2/2006 |

(Continued)

OTHER PUBLICATIONS

English Translation of foreign patent document CN104881371 cited in IDS filed on Apr. 9, 2024, pp. 1-13 (Year: 2015).*

(Continued)

*Primary Examiner* — S. Sough
*Assistant Examiner* — Zheng Wei
(74) *Attorney, Agent, or Firm* — Workman Nydegger

(57) ABSTRACT

A processor records a trace of execution of an execution entity, including recording initial processor register state into the trace. The recorded initial processor register state includes a value of at least one register of a plurality of registers. Subsequent to recording initial processor register state, and based on detection of a cache miss during execution of the execution entity, the processor records an influx of data imported into the processor cache in response to the cache miss. Also subsequent to recording initial processor register state, and based on execution of a non-deterministic processor instruction of the execution entity, the processor records at least one side effect of an access to at least one model-specific register, including recording a change in the value of the at least one register of the plurality of registers. The change results from the execution of the non-deterministic processor instruction of the execution entity.

18 Claims, 6 Drawing Sheets

Related U.S. Application Data continuation of application No. 15/349,555, filed on Nov. 11, 2016, now Pat. No. 10,031,834, which is a continuation-in-part of application No. 15/253,027, filed on Aug. 31, 2016, now Pat. No. 10,031,833.

(56) References Cited

U.S. PATENT DOCUMENTS

| | | | |
|---|---|---|---|
| 5,894,575 A * | 4/1999 | Levine | G06F 11/3636 |
| | | | 714/E11.215 |
| 7,506,318 B1 | 3/2009 | Lindo et al. | |
| 8,370,806 B2 | 2/2013 | Codrescu et al. | |
| 8,578,340 B1 | 11/2013 | Jakab et al. | |
| 9,037,911 B2 | 5/2015 | Rentschler et al. | |
| 9,092,376 B1 | 7/2015 | Chelur et al. | |
| 9,465,680 B1 | 10/2016 | Chynoweth et al. | |
| 9,678,150 B2 | 6/2017 | Schelle et al. | |
| 10,496,537 B2 | 12/2019 | Mola | |
| 2003/0037089 A1 | 2/2003 | Cota-robles et al. | |
| 2004/0103250 A1 | 5/2004 | Alsup | |
| 2004/0148472 A1 | 7/2004 | Barroso et al. | |
| 2005/0021708 A1 | 1/2005 | Raghuraman et al. | |
| 2005/0138471 A1 | 6/2005 | Okbay | |
| 2006/0259823 A1* | 11/2006 | Sohm | G06F 11/3636 |
| | | | 714/E11.207 |
| 2008/0256339 A1 | 10/2008 | Xu et al. | |
| 2009/0119493 A1 | 5/2009 | Venkitachalam et al. | |
| 2009/0248611 A1 | 10/2009 | Xu et al. | |
| 2010/0005464 A1* | 1/2010 | Malyugin | G06F 11/3476 |
| | | | 718/1 |
| 2011/0145530 A1 | 6/2011 | Taillefer et al. | |
| 2012/0011491 A1* | 1/2012 | Eldar | G06F 11/3612 |
| | | | 717/130 |
| 2012/0066551 A1 | 3/2012 | Palus et al. | |
| 2012/0095728 A1 | 4/2012 | Ubukata | |
| 2012/0179872 A1 | 7/2012 | Strumpen | |
| 2012/0209812 A1 | 8/2012 | Bezbaruah et al. | |
| 2013/0055206 A1 | 2/2013 | Dudek et al. | |
| 2013/0159999 A1 | 6/2013 | Chiueh et al. | |
| 2014/0047196 A1 | 2/2014 | Frey et al. | |
| 2014/0189256 A1 | 7/2014 | Kranich et al. | |
| 2014/0310465 A1 | 10/2014 | Chambliss et al. | |
| 2016/0210251 A1 | 7/2016 | Nale et al. | |
| 2017/0052876 A1 | 2/2017 | Svensson | |
| 2017/0091091 A1 | 3/2017 | Bradbury et al. | |
| 2017/0308480 A1 | 10/2017 | Wilson | |
| 2017/0322881 A1 | 11/2017 | Gschwind et al. | |
| 2020/0349051 A1 | 11/2020 | Mola | |
| 2022/0138084 A1 | 5/2022 | Mola | |

FOREIGN PATENT DOCUMENTS

| | | |
|---|---|---|
| CN | 1818873 A | 8/2006 |
| CN | 101103337 A | 1/2008 |
| CN | 101403983 A | 4/2009 |
| CN | 101765093 A | 6/2010 |
| CN | 101874238 A | 10/2010 |
| CN | 102402458 A | 4/2012 |
| CN | 102436490 A | 5/2012 |
| CN | 102597958 A | 7/2012 |
| CN | 102622276 A | 8/2012 |
| CN | 102844744 A | 12/2012 |
| CN | 103365794 A | 10/2013 |
| CN | 103856480 A | 6/2014 |
| CN | 103870394 A | 6/2014 |
| CN | 103885894 A | 6/2014 |
| CN | 104040500 A | 9/2014 |
| CN | 104750459 A | 7/2015 |
| CN | 104881371 A | 9/2015 |
| CN | 105408877 A | 3/2016 |
| CN | 106462507 A | 2/2017 |
| CN | 107533507 A | 1/2018 |
| CN | 109643273 A | 4/2019 |
| EP | 2642418 A2 | 9/2013 |
| EP | 3526673 A1 | 8/2019 |
| EP | 3740871 B1 | 8/2022 |
| GB | 2365553 A | 2/2002 |
| JP | H11161545 A | 6/1999 |
| JP | 2000148533 A | 5/2000 |
| JP | 2002207613 A | 7/2002 |
| JP | 2002304328 A | 10/2002 |
| JP | 2007207223 A | 8/2007 |
| JP | 2008204101 A | 9/2008 |
| JP | 2008293472 A | 12/2008 |
| JP | 2014191622 A | 10/2014 |
| KR | 20110134855 A | 12/2011 |
| RU | 2425412 C2 | 7/2011 |
| RU | 2429525 C2 | 9/2011 |
| RU | 2520344 C2 | 6/2014 |
| RU | 2599537 C2 | 10/2016 |

OTHER PUBLICATIONS

English Translation of foreign patent document CN101765093 cited in IDS filed on Apr. 9, 2024, pp. 1-5 (Year: 2010).*
"Notice of Allowance Issued in European Patent Application No. 19707256.4", dated Jul. 28, 2022, 2 Pages. (MS# 403661-EP-EPT).
"Notice of Allowance Issued in Chinese Patent Application No. 201780069596.2", dated Jul. 14, 2022, 6 Pages. (MS# 360143-CN-PCT).
Long, et al., "A Replay System for Performance Analysis of Multi-Threaded Programs", In Journal of Computer Research and Development, vol. 52, Issue 1, 2015, pp. 45-55.
Zhou, et al., "RReplay: A Record and Replay System Based on Restricted Multi-threading", In Proceedings of International Conference on Computer Science and Service System, Aug. 11, 2012, pp. 2247-2250.
"First Office Action and Search Report Issued in Chinese Patent Application No. 201780069596.2", dated Jan. 6, 2022, 16 Pages. (MS# 360143-CN-PCT).
"Office Action Issued in Russian Patent Application No. 2020113601", dated Jan. 31, 2022, 9 Pages. (MS# 403008-RU-PCT).
Quinbo, et al., "Research on Virtual Machine Based Deterministic Execution of Multi-core System", In Thesis Submitted to Graduate School of National University of Defense Technology, Changsha, China, Nov. 2011, 88 Pages.
"Office Action Issued in European Patent Application No. 19701943.3", dated Feb. 16, 2022, 5 Pages. (MS# 403411-EP-EPT).
"Office Action Issued in Japanese Patent Application No. 2020-509444", dated May 10, 2022, 6 Pages. (MS# 403008-JP-PCT).
"Notice of Allowance Issued in Russian Patent Applicant No. 2020113601", dated May 11, 2022, 20 Pages. (MS# 403008-RU-PCT).
"Summons to attend oral proceedings Issued in European Patent Application No. 17768274.7", Mailed Date: Mar. 24, 2022, 10 Pages. (MS# 360084-EP-EPT).
"Notice of Allowance Issued in European Patent Application No. 17801198.7", dated Mar. 17, 2022, 2 Pages. (MS# 360143-EP-EPT).
"Notice of Allowance Issued in European Patent Application No. 18718264.7", dated Mar. 24, 2022, 2 Pages. (MS# 401989-EP-EPT).
"Office Action Issued in Indian Patent Application No. 201947045870", dated Feb. 24, 2022, 6 Pages. (MS# 400714-IN-PCT).
"Office Action Issued in Indian Patent Application No. 202047005079", dated Mar. 4, 2022, 6 Pages. (MS# 403008-IN-PCT).
"Office Action Issued in Indian Patent Application No. 202047023383", dated Mar. 31, 2022, 8 Pages. (MS# 403411-IN-PCT).
"Notice of Allowance Issued in Japanese Patent Application No. 2020-509444", dated Sep. 6, 2022, 5 Pages. (MS# 403008-JP-PCT).
"Notice of Allowance Issued in Israel Patent Application No. 272745", dated Aug. 4, 2022, 3 Pages. (MS# 403008-IL-PCT).
"Notice of Allowance Issued in Korean Patent Application No. 10-2020-7011236", dated Sep. 28, 2022, 8 Pages. (MS# 403008-KR-PCT).
"Non Final Office Action Issued in U.S. Appl. No. 17/155,892", dated Oct. 7, 2022, 15 Pages. (MS# 401989-US-DIV[2]).

(56) References Cited

OTHER PUBLICATIONS

"Notice of Allowance Issued in European Patent Application No. 17768274.7", dated Oct. 19, 2022, 8 Pages. (MS# 360084-EP-EPT).
"Office Action Issued in Colombian Patent Application No. NC2020/0002932", dated Sep. 28, 2022, 10 Pages. (MS# 403008-CO-PCT).
"Office Action Issued in Indonesian Patent Application No. P00202002113", dated Oct. 17, 2022, 4 Pages. (MS# 403008-ID-PCT).
"First Office Action and Search Report Issued in Chinese Patent Application No. 201880021127.8", dated Nov. 10, 2022, 12 Pages. (MS# 401989-CN-PCT).
"Office Action Issued in Australian Patent Application No. 2018334370", dated Nov. 18, 2022, 2 Pages. (MS# 403008-AU-PCT).
"Notice of Allowance Issued in Australian Patent Application No. 2018334370", dated Dec. 12, 2022, 3 Pages. (MS# 403008-AU-PCT).
"Second Office Action Issued in Chinese Patent Application No. 201780069596.2", dated Apr. 27, 2022, 11 Pages. (MS# 360143-CN-PCT).
"Notice of Allowance Issued in Russian Patent Application No. 2020131078", dated Apr. 5, 2022, 25 Pages. (MS# 403661-RU-PCT).
"Notice of Allowance Issued in European Patent Application No. 19707256.4", dated Apr. 29, 2022, 7 Pages. (MS# 403661-EP-EPT).
"Office Action Issued in Chile Patent Application No. 202000645", dated Oct. 12, 2021, 12 Pages. (MS# 403008-CL-PCT).
"Office Action Issued in Indian Patent Application No. 202047030222", dated Jun. 15, 2022, 6 Pages. (MS# 403714-IN-PCT).
"Office Action Issued in Indian Patent Application No. 202047030458", dated Jun. 14, 2022, 6 Pages. (MS# 403661-IN-PCT).
Chen, et al., "Parametric and Sliced Causality", In the Proceedings of International Conference on Computer Aided Verification, Jul. 3, 2007, pp. 240-253.
"Office Action Issued in Indian Patent Application No. 202047031231", dated May 13, 2022, 6 Pages. (MS# 404312-IN-PCT).
"Search Report Issued in European Patent Application No. 22158923.7", dated Jul. 6, 2022, 12 Pages. MS# 360143-EP-ETD).
"Search Report Issued in European Patent Application No. 22160576.9", dated May 23, 2022, 10 Pages. (MS# 401989-EP-ETD).
Chen, et al., "Deterministic Replay: A Survey", In the Journal of ACM Computing Surveys, vol. 48, Issue 2, Sep. 24, 2015, 47 Pages.
"Notice of Allowance Issued in European Patent Application No. 19707993.2", dated Dec. 5, 2022, 8 Pages. (MS# 404312-EP-EPT).
"Office Action Issued in Indonesia Patent Application No. P00202006075", dated Nov. 23, 2022, 6 Pages. (MS# 404312-ID-PCT).
"Office Action Issued in Indian Patent Application No. 201947019259", dated Sep. 22, 2021, 7 Pages. (MS# 360143-IN-PCT).
"Notice of Allowance Issued in Chile Patent Application No. 202000645", dated Jun. 9, 2022, 2 Pages. (MS# 403008-CL-PCT).
"Notice of Allowance Issued in European Patent Application No. 19701943.3", dated Juiy 7, 2023, 7 Pages. (MS# 403411-EP-EPT).
U.S. Appl. No. 17/473,627, filed Sep. 13, 2021.
U.S. Appl. No. 15/349,555, filed Nov. 11, 2016.
U.S. Appl. No. 16/029,372, filed Jul. 6, 2018.
U.S. Appl. No. 15/253,027, filed Aug. 31, 2016.
U.S. Appl. No. 14/319,092, filed Jun. 30, 2014.
U.S. Appl. No. 14/751,638, filed Jun. 26, 2015.
U.S. Appl. No. 62/143,435, filed Apr. 6, 2015.
U.S. Appl. No. 16/057,353, filed Aug. 7, 2018.
U.S. Appl. No. 15/252,998, filed Aug. 31, 2016.
U.S. Appl. No. 16/372,705, filed Apr. 2, 2019.
U.S. Appl. No. 15/298,439, filed Oct. 20, 2016.
U.S. Appl. No. 15/637,376, filed Jun. 29, 2017.
U.S. Appl. No. 15/349,474, filed Nov. 11, 2016.
U.S. Appl. No. 15/433,918, filed Feb. 15, 2017.
U.S. Appl. No. 15/604,408, filed May 24, 2017.
U.S. Appl. No. 16/686,564, filed Nov. 18, 2019.
U.S. Appl. No. 17/515,705, filed Nov. 1, 2021.
U.S. Appl. No. 15/604,334, filed May 24, 2017.
U.S. Appl. No. 16/377,470, filed Apr. 8, 2019.
U.S. Appl. No. 16/374,172, filed Apr. 3, 2019.
U.S. Appl. No. 17/155,892, filed Jan. 22, 2021.
U.S. Appl. No. 15/488,282, filed Apr. 14, 2017.
U.S. Appl. No. 62/480,408, filed Apr. 1, 2017.
U.S. Appl. No. 15/915,930, filed Mar. 8, 2018.
U.S. Appl. No. 62/559,780, filed Sep. 18, 2017.
U.S. Appl. No. 15/872,453, filed Jan. 16, 2018.
U.S. Appl. No. 15/904,072, filed Feb. 23, 2018.
"Office Action Issued in Australian Patent Application No. 2019223807", dated Aug. 7, 2023, 2 Pages. (MS# 404312-AU-PCT).
"Notice of Allowance Issued in Japanese Patent Application No. 2020-537480", dated Aug. 4, 2023, 5 Pages. (MS# 404312-JP-PCT).
"Office Action Issued in European Patent Application No. 18773284.7", dated Nov. 12, 2021, 12 Pages. (MS# 400714-EP-EPT).
"Office Action Issued in Indian Patent Application No. 201847049857", dated Nov. 18, 2021, 6 Pages. (MS# 360084-IN-PCT).
"Office Action Issued in Russian Patent Application No. 2020131078", dated Nov. 16, 2021, 10 Pages. (MS# 403661-RU-PCT).
"Decision to Grant Issued in Russian Patent Application No. 2020131084", dated Nov. 10, 2021, 25 Pages. (MS# 404312-RU-PCT).
"Notice of Allowance Issued in European Patent Application No. 17768274.7", dated Apr. 28, 2023, 2 Pages. (MS# 360084-EP-EPT).
"Extended Search Report Issued in European Patent Application No. 23164451.9", dated Jun. 5, 2023, 12 Pages. (MS# 360084-EP-ETD).
"Notice of Allowance Issued in Indonesian Patent Application No. P00202006083", dated May 9, 2023, 4 Pages. (MS# 403661-ID-PCT).
U.S. Appl. No. 15/898,372, filed Feb. 16, 2018.
U.S. Appl. No. 15/947,699, filed Apr. 6, 2018.
"Notice of Allowance Issued in U.S. Appl. No. 17/155,892", dated Feb. 24, 2023, 8 Pages. (MS# 401989-US-DIV[2]).
"Notice of Allowance Issued in European Patent Application No. 17768274.7", dated Feb. 7, 2023, 8 Pages. (MS# 360084-EP-EPT).
"Notice of Allowance Issued in European Patent Application No. 19707993.2", dated Mar. 2, 2023, 2 Pages. (MS# 404312-EP-EPT).
"Office Action Issued in Japanese Patent Application No. 2020-537480", dated Feb. 8, 2023, 4 Pages. (MS# 404312-JP-PCT).
"Notice of Allowance Issued in Japanese Patent Application No. 2020-544520", dated Jan. 27, 2023, 6 Pages. (MS# 403661-JP-PCT).
"Notice of Allowance Issued in Israeli Patent Application No. 276650", dated Jan. 24, 2023, 3 Pages. (MS# 404312-IL-PCT).
"Notice of Allowance Issued in Israeli Patent Application No. 276652", dated Jan. 24, 2023, 3 Pages. (MS# 403661-IL-PCT).
"Office Action Issued in Indonesian Patent Application No. P00202006083", dated Jan. 26, 2023, 4 Pages. (MS# 403661-ID-PCT).
"Notice of Allowance Issued in U.S. Appl. No. 15/898,372", dated Mar. 31, 2023, 7 Pages. (MS# 403714-US-NP).
"Second Office Action Issued in Chinese Patent Application No. 201880021127.8", dated Apr. 13, 2023, 10 Pages. (MS# 401989-CN-PCT).
"First Office Action and Search Report Issued in Chinese Patent Application No. 201880043765.X", dated Mar. 28, 2023, 10 Pages. (MS# 400714-CN-PCT).
"First Office Action and Search Report Issued in Chinese Patent Application No. 201880060330.6", dated Mar. 25, 2023, 11 Pages. (MS# 403008-CN-PCT).
"First Office Action and Search Report Issued in Chinese Patent Application No. 201980008659.2", dated Apr. 3, 2023, 10 Pages. (MS# 403411-CN-PCT).
"Notice of Allowance Issued in Indonesian Patent Application No. P00202002113", dated Mar. 17, 2023, 4 Pages. (MS# 403008-ID-PCT).
"Office Action issued in Korean Patent Application No. 10-2020-7026919", dated Jun. 15, 2023, 5 Pages. (MS# 403661-KR-PCT).
"Office Action issued in Korean Patent Application No. 10-2020-7026922", dated Jun. 14, 2023, 5 Pages. (MS# 404312-KR-PCT).

(56) References Cited

OTHER PUBLICATIONS

"Office Action issued in Australian Patent Application No. 2019223883", dated Jun. 20, 2023, 3 Pages. (MS# 403661-AU-PCT).
Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.
"Notice of Allowance Issued in Chinese Patent Application No. 201880021127.8", dated Jul. 4, 2023, 9 Pages (MS# 401989-CN-PCT).
"Notice of Allowance Issued in Chinese Patent Application No. 201880060330.6", dated Jul. 6, 2023, 4 Pages (MS# 403008-CN-PCT).
"Notice of Allowance Issued in Indonesian Patent Application No. P00202006075", dated May 31, 2023, 4 Pages. (MS# 404312-ID-PCT).
"Notice of Allowance Issued in Australian Patent Application No. 2019223883", dated Jun. 30, 2023, 3 Pages. (MS# 403661-AU-PCT).
"Office Action Issued in Mexican Patent Application No. MX/a/2020/002865", Mailed date: Jul. 18, 2023, 5 Pages.
"Notice of Allowance Issued in China Patent Application No. 201880043765.X", Mailed Date: Aug. 9, 2023, 4 Pages.
"Notice of Allowance Issued in Chinese Patent Application No. 201980008659.2", Mailed Date: Aug. 24, 2023, 4 Pages.
"Notice of Allowance Issued in U.S. Appl. No. 15/898,372", Mailed Date: Sep. 29, 2023, 17 Pages.
"Office Action Issued in New Zeland Application No. 761306", Mailed Date: Oct. 9, 2023, 2 Pages.
"Notice of Allowance Issued in New Zealand Patent Application No. 761306", Mail Date: Oct. 16, 2023, 2 Pages.
"Notice of Allowance Issued in European Patent Application No. 19701943.3", Mailed Date: Nov. 9, 2023, 2 Pages.
Notice of Allowance mailed on Jan. 10, 2024, in U.S. Appl. No. 17/515,705, 9 pages.
Mounika, et al., "Exploiting cache coherence for effective on-the-fly data tracing in multicores," 2016 IEEE 34th International Conference on Computer Design, Oct. 2, 2016, pp. 312-319.
Office Action Received for Australian Application No. 2019223807, mailed on Jan. 31, 2024, 03 pages.
Office Action Received for Chinese Application No. 201980014496.6, mailed on Jan. 17, 2024, 11 pages (English Translation Provided).
Uzelac et, et al., "Hardware-Based Load Value Trace Filtering for On-the-Fly Debugging", ACM transactions on embedded computing systems, ACM, vol. 12, No. 2, May 1, 2013, pp. 1-18.
Office Action Received for Chinese Patent Application No. 201980013653.4, mailed on Jan. 26, 2024, 10 pages (English Translation Provided).
Notice of Allowance mailed on Jan. 23, 2024, in U.S. Appl. No. 17/155,892, 05 pages.
Office Action Received for Chinese Application No. 201980014858.4, mailed on Feb. 27, 2024, 15 pages (English Translation Provided).
Examination report Received for Malaysia Application No. PI2020001244, mailed on Mar. 19, 2024, 2 pages.
Office Action Received for Mexico Application No. MX/a/2020/002865, mailed on Mar. 18, 2024, 4 pages (English Translation Provided).
Communication pursuant to Rules 70(2) and 70a(2) EPC and reference to Rule 39(1) EPC received for European Application No. 22158923.7, Mailed on Aug. 8, 2022, 2 Pages.
Communication pursuant to Rules 70(2) and 70a(2) EPC and reference to Rule 39(1) EPC received for European Application No. 22160576.9, mailed on Aug. 1, 2022, 2 Pages.
Communication under Rule 71(3) received for European Application No. 17801198.7, mailed on Dec. 16, 2021, 5 Pages.
Communication under Rule 71(3) received for European Application No. 1871826.7, mailed on Dec. 2, 2021, 5 Pages.
Communication under Rule 71(3) received for European Application No. 19722220.1, mailed on Jul. 19, 2021, 7 pages.
Communication under Rule 71(3) received for European Application No. 18740440.5, mailed on Mar. 24, 2021, 7 Pages.
Decision to grant pursuant to Article 97(1) received for European Application No. 19722220.1, mailed on Nov. 5, 2021, 2 Pages.
Decision to grant pursuant to Article 97(1) received for European Application No. 18740440.5, mailed on Jul. 1, 2021, 2 Pages.
Notice of Acceptance received for South African Patent Application No. 2020/01262, mailed on Mar. 9, 2021, 1 Page.
Notice of Acceptance received for South African Patent Application No. 2020/04082, mailed on Jul. 14, 2021, 1 Page.
Notice of Acceptance received for South African Patent Application No. 2020/04083, mailed on Jul. 14, 2021, 1 Page.
Notice of Allowance Received for Korean Application No. 10-2020-7026919, mailed on Dec. 4, 2023, 08 pages (English Translation Provided).
Notice of Allowance Received for Korean Application No. 10-2020-7026922, mailed on Jan. 22, 2024, 08 pages (English Translation Provided).
Office Action Received for Thailand Application No. 2001001481, mailed on May 27, 2024, 8 pages (English Translation Provided).
Summons to Attend Oral Proceedings received for European Application No. 17801198.7, mailed on Aug. 4, 2021. 8 Pages.
Watson, et al., "CHERI: A hybrid capability-system architecture for scalable software compartmentalization", IEEE Symposium on Security and Privacy, May 17, 2015, 18 Pages.
Office Action Received for Mexican Application No. MX/a/2020/008661, mailed on May 6, 2024, 7 pages. (English Translation Provided).
Communication pursuant to Article 71(3) EPC, Received for European Application No. 22160576.9, mailed on Jun. 17, 2024, 7 pages.
Office Action Received for Malaysia Application No. PI2020004174, mailed on May 31, 2024, 2 pages.
Office Action Received for Mexican Application No. MX/a/2020/008664, mailed on May 30, 2024, 6 pages (English Translation Provided).

\* cited by examiner

CACHE-BASED TRACING FOR TIME TRAVEL DEBUGGING AND ANALYSIS

CROSS REFERENCE TO RELATED APPLICATIONS

This application is a continuation of U.S. patent application Ser. No. 16/029,372, filed Jul. 6, 2018 and titled "CACHE-BASED TRACING FOR TIME TRAVEL DEBUGGING AND ANALYSIS," which is a continuation of U.S. patent application Ser. No. 15/349,555, filed Nov. 11, 2016 and titled "CACHE-BASED TRACING FOR TIME TRAVEL DEBUGGING AND ANALYSIS," which issued as U.S. Pat. No. 10,031,834 on Jul. 24, 2018, which is a continuation-in-part of U.S. patent application Ser. No. 15/253,027, filed Aug. 31, 2016, and titled "CACHE-BASED TRACING FOR TIME TRAVEL DEBUGGING AND ANALYSIS," which issued as U.S. Pat. No. 10,031,833 on Jul. 24, 2018. The entire contents of each of the foregoing applications are incorporated by referenced herein in their entireties.

BACKGROUND

When writing source code during the development of software applications, developers commonly spend a significant amount of time "debugging" the source code to find runtime errors in the code. For example, a developer may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs and occupy a significant portion of application development time.

Debugging applications ("debuggers") have been developed in order to assist with the code debugging process. Many such tools offer the ability to trace, visualize, and alter the execution of computer code. For example, debuggers may visualize the execution of code instructions (e.g., source code, assembly code, etc.) and variable values, and enable the user to alter aspects of the code execution. Commonly, debuggers enable a user to set "breakpoints" in source code (e.g., a particular instruction or statement in source code) which, when reached during execution, cause execution of the program to be suspended. When source code execution is suspended, a user may be presented variable values and be given options to choose how to proceed (e.g., by terminating execution, by continuing execution as normal, by stepping into, over, or out of statements/function calls, etc.). However, classic debuggers only enable code execution to be observed/altered in a single direction—forward. For example, classic debuggers do not enable a user to choose to go back to a prior breakpoint.

An emerging form of debugging is "time travel" debugging, in which execution of a program is recorded into a trace, which can be then be replayed and analyzed both forwards and backwards.

BRIEF SUMMARY

Embodiments herein are directed to new implementations of recording and replaying traces for time travel debugging that can produce orders-of-magnitude performance improvements over prior attempts, that enable recording of multi-threaded programs whose threads freely run concurrently across multiple processing units, and that can produce trace files with orders of magnitude size reduction over the trace files of prior attempts.

In some embodiments, a processor comprising a processor cache records a replay-able trace of execution of an execution entity. Recording the replay-able trace includes, based on detection of a cache miss during the execution of the execution entity, recording an influx of data imported into the processor cache in response to the cache miss, and setting a hardware bit on a cache line of the processor cache storing the influx of data, the hardware bit indicating that the cache line has been recorded into a trace. Recording the replay-able trace also includes recording at least one event, the at least one event selected from a group consisting of: (i) an un-cached read resulting from execution of the execution entity, the recorded event including the result of the un-cache read; (ii) execution of a non-deterministic processor instruction, the recorded event including a register value changed by the execution of the non-deterministic processor instruction; and (iii) an access to a model-specific register, the recorded event including a side effect of the access to the model-specific register.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments herein are directed to new implementations of recording and replaying traces for time travel debugging that can produce orders-of-magnitude performance improvements over prior attempts, that enable recording of multi-threaded programs whose threads freely run concurrently across multiple processing units, and that can produce trace files with orders of magnitude size reduction over the trace files of prior attempts.

Generally, a goal of time travel debugging is to capture in a trace which processor instructions an executable entity (e.g., user-mode threads, kernel threads, a hypervisor, etc.) executes, such that these instructions can be replayed from the trace with absolute precision at a later time, at whatever granularity is needed. Being able to replay every instruction executed as part of application code enables the illusion of backwards replay of the application later. For example, to hit a breakpoint in the backwards direction, the trace is replayed from a time prior to the breakpoint, and the replay stops at the last time that breakpoint hits that is before where the debugger is currently analyzing the code stream.

Prior attempts to provide time travel debugging have suffered from several compromises that have led to limited adoption. For example, prior attempts apply significant restrictions on code execution, such as requiring a trace to include a strict ordering of all the instructions executed (i.e., a fully sequentially consistent recording model). This is accomplished, for example, by requiring that multi-threaded programs be executed non-concurrently on a single core, or by requiring that program instructions be executed non-concurrently in lock-step on multiple cores (e.g., execute N instructions on one processor core, then N on another processor core, and so on). These are significant limitations in view of today's highly multi-threaded code and highly parallel multi-core and hyper-threaded processors. Further, prior attempts cause significant program performance degradation, and typically produce exceptionally large trace files (particularly when emulating multiple cores), at least in part because they deterministically record the execution of each and every instruction, and create a comprehensive record of full memory state during program execution. Each of the foregoing has made prior attempts at time travel debugging both exceptionally slow, and unrealistic for both use in production environments and for long-term tracing of program execution, especially for applications having many threads running concurrently.

Operating Environment

Figure 1:
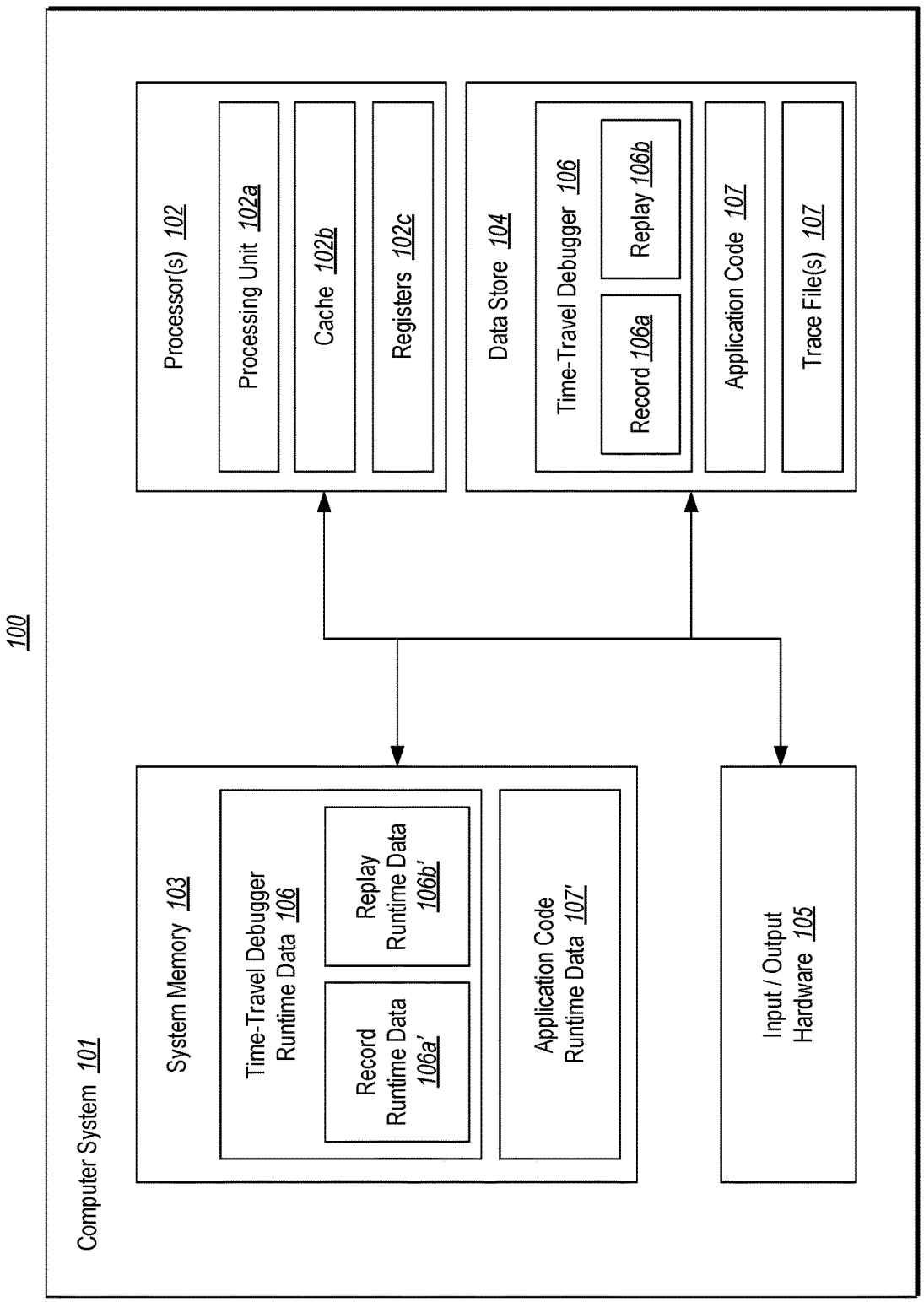
FIG. 1 illustrates an example computer architecture in which embodiments of time travel debugging may operate.

Initially, FIG. 1 illustrates an example computing environment 100 in which embodiments of time travel debugging may operate according to the present invention. Embodiments of the present invention may comprise or utilize a special-purpose or general-purpose computer system 101 that includes computer hardware, such as, for example, one or more processors 102, system memory 103, one or more data stores 104, and/or input/output hardware 105.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103 and/or the depicted data store 104 which can store computer-executable instructions and/or data structures.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise hardware (e.g., a network interface module (e.g., a "NIC")) that connects a network and/or data link which can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a NIC (e.g., input/output hardware 105), and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the one or more processors 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

As illustrated, the data store 104 can store computer-executable instructions and/or data structures representing a time travel debugger 106 and application code 107 that is the subject of tracing/debugging by the time travel debugger 106. When these programs are executing (e.g., using the processor(s) 102), the system memory 103 can store corresponding runtime data, such as runtime data structures, computer-executable instructions, etc. Thus, FIG. 1 illustrates the system memory 103 as including time travel debugger runtime data 106' and application code runtime data 107'.

As depicted, the time travel debugger 106 includes one or more components or modules, such as a record component 106a and a replay component 106b. At appropriate times, these components may also include corresponding runtime data (illustrated as record runtime data 106a' and replay runtime data 106b') in the system memory 103. During execution, the record component 106a/record runtime data 106a' records one or more trace file(s) 108 documenting execution of the application code 107 at the processor(s) 102. Later, the replay component 106b/replay runtime data 106b' can use the trace file(s) 108, in connection with the application code 107, to replay execution of the application code 107 both forwards and backwards. While the trace file(s) 108 are depicted as being stored in the data store 104, these trace file(s) 108 may also be recorded, at least temporarily, in the system memory 103 or at some other storage device. It is noted that the record component 106a may exist at one computer system, and the replay component 106b may exist at another computer system. As such, execution of a program may be traced/recorded on one system, and replayed on another system.

FIG. 1 includes a general representation of the internal hardware components of the processors(s) 102. As illustrated, the processors(s) 102 include one or more processing units 102a (i.e., cores). Each processing unit 102a comprises hardware logic that executes processor instructions that are defined by applications, and which instructions are selected from among a predefined processor instruction set architecture. The particular instruction set architecture of the processors(s) 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally-visible (i.e., external to the processor) unit of code that is executable by a processor.

The processing units 102a obtain the processor instructions from a cache 102b, and execute the processor instructions based on data in the cache 102b, based on data in registers 102c, and/or without input data. In general, the cache 102b is a small amount (i.e., small relative to the typical amount of system memory 103) of random-access memory that stores on-processor copies of portions of the system memory 103. For example, when executing the application code 107, the cache 102b contains portions of the application code runtime data 107'. If the processing unit(s) 102a require data not already stored in the cache 102b, then a "cache miss" occurs, and that data is fetched from the system memory 103 (typically evicting some other data from the cache 102b). The cache 102b is generally divided into at least a code cache and a data cache. For example, when executing the application code 107, the code cache stores at least a portion of the processor instructions stored in the application code runtime data 107' and the data cache stores at least a portion of data structures of the application code runtime data 107'. In general, the cache 102b is divided into separate tiers/levels (e.g., layer 1, layer 2, and layer 3), with some tiers (e.g., layer 3) potentially existing separate from the processor 102. The registers 102c are hardware based storage locations that are defined based on the instruction set architecture of the processors(s) 102.

While not expressly depicted, each of the processors(s) 102 typically include a plurality of processing units 102a. As such, the computer system may include a plurality of different processors 102, which each includes a plurality of processing cores. In these situations, a processor's cache 102b may include a plurality of distinct cache portions that each correspond to a different processing unit, and the registers may include distinct sets of registers that each correspond to a different processing unit. The computer system 101 can therefore execute a plurality of "threads" concurrently both at different processors 102 and/or at different processing units 102a within each processor.

Time Travel Debugging

As mentioned previously, previous attempts at time travel debugging would execute a multiple threads of a process non-concurrently on a single processor core, or execute multiple threads non-concurrently on different processors and/or processor cores, so that each instruction is executed—and recorded—in a precise deterministic order. Additionally, previous attempts would exhaustively record changes to memory state of a process in a deterministic manner, so that every memory value is known at any given time. The embodiments herein, however, are able to execute and trace a plurality of threads concurrently, removing the requirement that each instruction to be executed and recorded in a precise order, and are able to enable replay while recording much less than a full record of instruction execution and memory state.

At a conceptual level, the embodiments herein record a trace of execution of one or more threads of a process individually on one or more processors, and record these trace(s) in trace file(s) 108 that can be used to reproduce the inputs and outputs of each processor instruction executed as part of each thread (without necessarily recording each instruction executed), that includes an approximation of the order of instruction execution across different threads, and that stores enough information to predict relevant memory values, without exhaustively recording full changes to memory state. It is noted that, while the embodiments herein can trace all the threads of a process, they may also trace only a subset of the threads of a process. Also, it is noted that the embodiments herein may trace execution of the application code 107 on physical processor(s), on virtual processor(s) such as processor that is emulated through software, and/or even in virtual machine environments (e.g., .NET from MICROSOFT CORPORATION, JAVA from ORACLE CORPORATION, and the like). As an example of tracing within virtual machine environments, recording a JAVA program may include recording what operations and memory reads a "virtual processor" of a JAVA virtual machine performs. Alternatively, recording a JAVA program could include recording both the JAVA program and the JAVA virtual machine (e.g., by recording execution of native code that "just in time" compiles the JAVA code, that executes garbage collector, etc.). In the latter situation, the time travel debugger 106 may be configured to separate replay of the different layers (i.e., the application code vs. the JAVA virtual machine code).

The embodiments herein are built upon the recognition by the inventors that processor instructions (including virtual machine "virtual processor" instructions) can generally fall into one of three categories: (1) instructions identified as "non-deterministic" as not producing predictable outputs because their outputs are not fully determined by data in general registers or memory, (2) deterministic instructions whose inputs do not depend on memory values (e.g., they depend only on processor register values, or values defined in the code itself), and (3) deterministic instructions whose inputs depend on reading values from memory. Thus, in some embodiments, reconstructing the execution of instructions can be accomplished with solutions to three corresponding challenges: (1) how to record the non-deterministic instructions that produce output not fully determined by their inputs, (2) how to reproduce the values of input registers for instructions depending on registers, and (3) how to reproduce the values of input memory for instructions depending on memory reads.

As a solution to the first challenge, of how to record "non-deterministic" instructions executed by a thread that do not produce fully predictable outputs because their outputs are not fully determined by data in general registers or memory, embodiments including storing in the trace of the thread the side-effects of execution of such instructions. As used herein, "non-deterministic" instructions include somewhat less common instructions that (i) produce non-deterministic output each time they are executed (e.g., RDTSC on INTEL processors, which writes the number of processor cycles since the last processor reset into a register), that (ii) may produce a deterministic output, but depend on inputs not tracked by the record component 106a (e.g. debug registers, timers, etc.), and/or that (iii) produce processor specific information (e.g., CPUID on INTEL processors, which writes processor-specific data into registers). Storing the side-effects of execution of such instructions may include, for example, storing register values and/or memory values that were changed by execution of the instruction. In some architectures, such as from INTEL, processor features such as those found in Virtual Machine eXtensions (VMX) could be used to trap instructions for recording their side effects in the trace file(s) 108.

As a solution to the second challenge, of reproducing the values of input registers for deterministic instructions executed by a thread (e.g., whose inputs depend only on processor register values) is straightforward, as they are the outputs of the execution of the previous instruction(s) in the thread. Recording the execution of an entire series of processor instructions in the trace of the thread can therefore be reduced to reproducing the register values at the beginning of the series; the trace file(s) 108 need not store a record of which particular instructions executed in the series, or the intermediary register values. This is because the actual instructions are available in the application code 107 itself, and which are available at replay time. These instructions can therefore be supplied the recorded inputs (i.e., the recorded initial set of register values) during reply, to execute in the same manner as they did during the trace of the thread.

As a solution to the third challenge, of reproducing the values of input memory for deterministic instructions executed by a thread whose inputs depend on memory values, embodiments include recording in the trace of the thread the memory values that the instructions in the thread consumes (i.e., its reads)—irrespective of how the values that the instructions read were written to memory. In other words, some embodiments include recording only memory reads, but not memory writes. For example, although values may be written to memory by the current thread, by another thread (including the kernel, e.g., as part of processing an interrupt), or by a hardware device (e.g., input/output hardware 105), it is just the values that the thread's instructions read that are needed for full replay of instructions of the thread that perform reads. This is because it is that values that were read by the thread (and not necessarily all the values that were written to memory) that dictated how the thread executed. While in some embodiments, the value of each memory value read may be stored in the trace file(s) 108, other embodiments include optimizations such as prediction techniques that attempt to predict the appropriate values without necessarily recording each read. For example, in some implementations, if the predicted value is the value that was actually read from memory, then nothing needs to be recorded in the trace file(s) 108; however, if the predicted value does not match the value that was actually read then the value read is recorded in the trace file(s) 108. One such prediction technique is to predict that the next memory value read by a thread will be the same as the value previously read by the thread, as demonstrated below. Another prediction technique is to always predict that the next memory read will have a value of zero. Other example prediction techniques are also discussed later.

Additionally, since each of the threads are recorded independently from one another, the trace file(s) 108 do not need to record a strict ordering of each and every instruction executed across all threads (e.g., using a fully sequentially consistent recording model, as discussed above). However, it may be useful for later debugging to record an approximation of the order in which the instructions executed. Thus, in order to record an approximation of the order in which the instructions executed across threads, embodiments instead define or identify a "trace memory model" having defined "orderable" and "non-orderable" events Then, the record component 106a records the execution sequence of the "orderable" events that occurred during thread execution. For example, embodiments may use a monotonically incrementing number ("MIN") that is guaranteed not to repeat to record the sequence in which orderable events occurred across threads. In general, a trace memory model should define how threads can interact through shared memory, and their shared use of data in the memory. The trace memory model used may be a memory model defined by a programming language used to compile the application code 107 (e.g., C++ 14), or some other memory model defined for purposes of tracing (such as one defined by the time travel debugger 106).

As an example, a first trace memory model may treat as orderable only kernel calls (from user mode), traps, and exceptions. This trace memory model would have low overhead, since these operations are relatively "expensive" is their own right, they are likely tracked anyway and provide a very coarse grained overview of ordering.

A second example trace memory model may treat as orderable full fences (i.e., operations that are have both acquire & release semantics). Examples of such operations may include INTEL's "locked" instructions, kernel calls, exceptions, and traps. This memory model would provide enough ordering for nearly all cross-thread communication that happens in the process when the code uses "interlocked" types of primitives to communicate cross threads, which is common in operating such as WINDOWS from MICROSOFT CORPORATION).

A third example trace memory model may treat all acquires and releases as orderable. This memory model may be suitable for processors based ARM instruction sets, because ARM does not treat most loads and stores as acquires or releases. On other architectures, such as from INTEL (in which a majority of memory accesses are acquires or releases), this would equate to ordering almost all memory accesses.

A fourth example trace memory model may treat as orderable all memory loads. This would provide for strong ordering but may lead to decreased performance as compared to the other example memory models.

The foregoing memory models have been presented as examples only, and one of ordinary skill in the art will recognize, in view of the disclosure herein, there a vast variety of memory models may be chosen.

Figure 2:
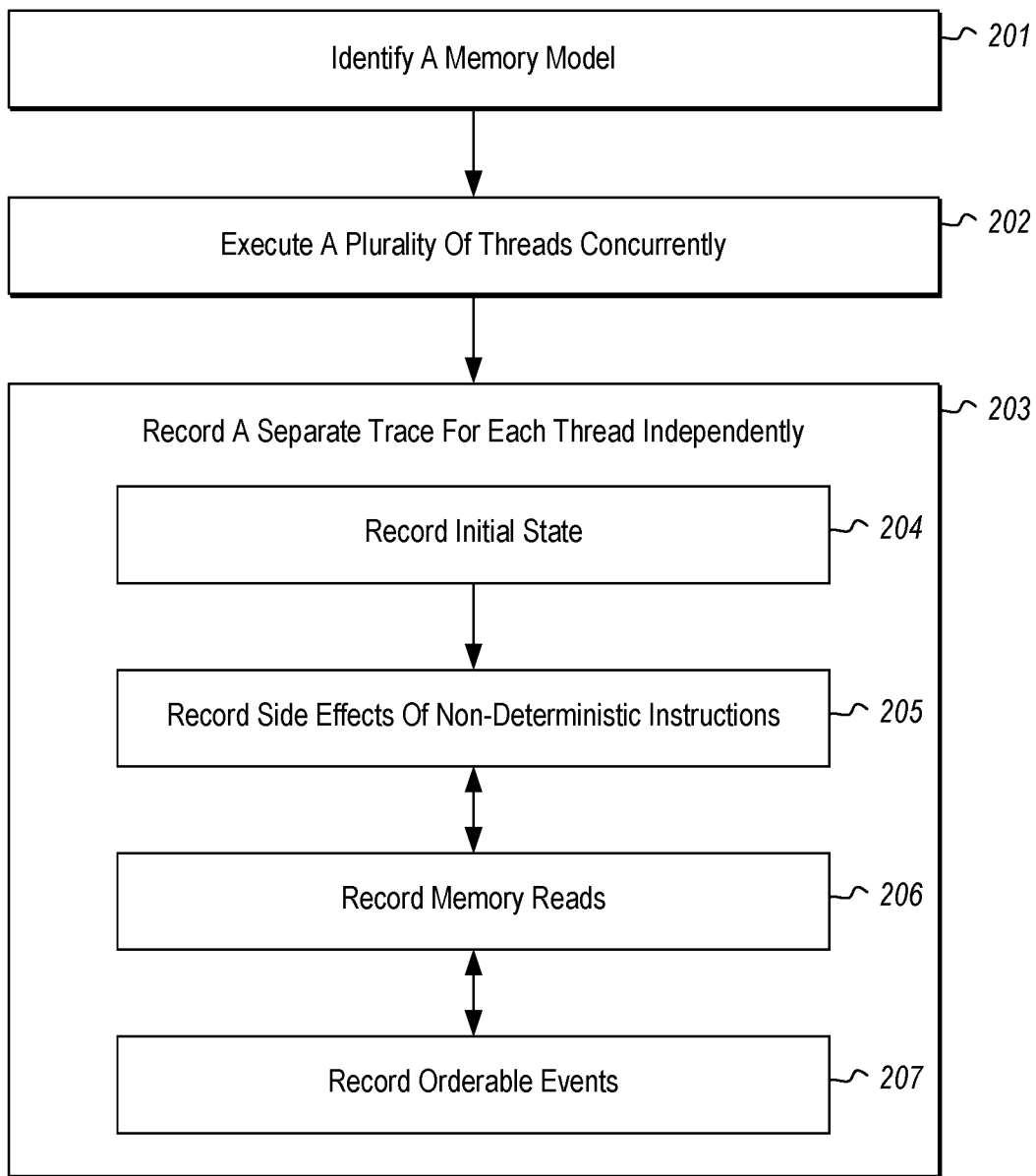
FIG. 2 illustrates a flow chart of an example method for recording a replay-able trace of execution of a multi-threaded process.

In view of the foregoing, FIG. 2 illustrates an example flowchart of a method 200 for recording a replay-able trace of execution of a multi-threaded process. As depicted, method 200 includes an act 201 of identifying a memory model. Act 201 may include identifying a trace memory model that defines one or more orderable events that are to be ordered across a plurality of threads of the multi-threaded process. For example, act 201 may include the record component 106a identifying or defining a memory model such as, as examples only, treating kernel calls, traps, and exceptions as orderable; treating full fences as orderable; treating all acquires and releases as orderable; treating all memory loads as orderable; etc., as discussed above.

FIG. 2 also depicts that method 200 incudes an act 202 of executing a plurality of threads concurrently. Act 202 may include executing the plurality of threads concurrently across one or more processing units of one or more processors, while observing their execution with the record component 106a. For example, act 202 may include executing a first thread of the process on a first processing unit 102a of a processor, while executing a second thread of the process on a second processing unit 102a of the same processor. As another example, act 202 may include executing two threads of the process on the same processing unit 102a of a processor that supports hyper-threading. As another example, act 202 may include executing two threads of the process on different processing units 102a of different processors. Combinations of the foregoing are also possible.

FIG. 2 also depicts that method 200 includes an act 203 of recording a trace for each thread independently. Act 203 may include, during execution of the plurality of threads, recording a separate replay-able trace for each thread independently. As will be clear in view of examples herein after, the recorded trace for each thread stands independent from one another, except that they may include orderable events that are identified by a MIN across the threads. As illustrated, act 203 may include sub-acts that are performed by the record component 106a for each thread, as they execute.

FIG. 2 also depicts that act 203 includes an act 204 of, for each thread, recording initial thread state. Act 204 may include the record component 106a storing initial processor register values, for example. Other initial thread state may include the Thread Environment Block (TEB) and/or the Process Environment Block (PEB) for the first thread of a process. Recording the TEB and/or the PEB may provide useful debugging information later (e.g., thread local storage data). Other initial thread state may include the thread's execution stack, particularly if the record component 106a is starting recording of a thread that is already executing.

FIG. 2 also depicts that act 203 may include an act 205 of recording side effects of non-deterministic instructions. Act 205 may include recording the side effects of at least one non-deterministic processor instruction executed by the thread. For example, the record component 106a may record the side effects of nondeterministic instructions by recording any changes made by the instructions to register values.

FIG. 2 also depicts that act 203 includes an act 206 of, for each thread, recording memory reads. Act 206 may include recording at least one memory read performed by at least one processor instruction executed by the thread that takes memory as input. For example, the record component 106a may record trace file(s) 108 that can be used to reproduce the values read from memory during replay time. This may include recording each read, or applying one or more algorithms to predict reads to reduce the number of read entries that need to be recorded in the trace file(s) 108.

FIG. 2 also depicts that act 203 includes an act 207 of, for each thread, recording orderable events. Act 207 may include recording a least one orderable event performed by the thread with a monotonically increasing number that orders the event among other orderable events across the plurality of threads. For example, the record component 106a may record the sequence of execution of events that are orderable by the trace memory model using a MIN that applies across threads. As such, the reply component 106b can ensure that these events are sequenced across thread during replay. One example orderable event is beginning of a trace. Others are given in connection with the examples of Tables 1 and 2 below.

As illustrated by the double-ended arrows between acts 205, 206, and 207, these acts may occur in any order, and may occur multiple times during tracing of a thread, as will become clear in connection with the following example.

When recording the trace, the record component 106a may employ compression techniques to reduce the size of the trace file(s) 108. For example, the record component 106a may dynamically compress the trace data prior to writing it to storage (whether that be in system memory 103 or data store 104). Alternatively, the record component 106a could compress the trace file(s) 108 at the conclusion of a recording.

Tables 1-5 illustrate a concrete example of tracing execution of a process using the method 200. In particular, Tables 1-5 illustrate example techniques for recording the execution of a single thread of a multi-threaded process. While, for simplicity and clarity, only one thread recorded in this example, the recording techniques need not change, irrespective of how many threads there are that modify program state. Additionally, even if there were external entities (e.g., the kernel, hardware) modifying shared memory, the recording techniques would not need to change. This is because these recording techniques record what a processing unit 102a actually sees (reads) and does when executing a thread, instead of focusing on constraining the execution to produce a fully predictable sequence of executed instructions.

Initially, Table 1 illustrates an example listing of processor instructions (e.g., from application code 107) to be executed by a processing unit 102a as part of a thread.

TABLE 1

Processor Instruction Listing

| Address | Instruction | Description |
| --- | --- | --- |
| 10 | Move R1 <- {Timer} | Read machine timer |
| 11 | Move R2 <- [A] | Read source buffer begin address |
| 12 | Move R3 <- [B] | Read target buffer begin address |
| 13 | Move R4 <- [C] | Read source buffer size (destination buffer is at least as big) |
| 14 | Move R5 <- 0 | |
| 15 | Move R6 <- 0 | |

TABLE 1-continued

Processor Instruction Listing

| Address | Instruction | Description |
|---|---|---|
| Loop: 16 | Compare R5 vs. R4 | |
| 17 | If not less jump to "Out:" {Instr. 25} | If (R5 >= R4) exit loop |
| 18 | Move R7 <- [R2 + R5] | Read from source buffer the element at "index" R5 |
| 19 | ++R5 | |
| 20 | Compare R7 vs. 0 | Is the value we just read zero? |
| 21 | If equal jump to "Loop:" {Instr. 16} | If we read zero continue to next iteration |
| 22 | Move [R3 + R6] <- R7 | Write the newly read value to the destination buffer |
| 23 | ++R6 | |
| 24 | Jump to "Loop:" {Instr. 16} | |
| Out: 25 | Move R2 <- {Timer} | |
| 26 | Subtract R1 <- R2 − R1 | |

In Table 1, the "Address" column refers to a memory address (e.g., in the instruction portion of the cache 102b) where the instruction specified in the "Instruction" column is found. These addresses are simplified to two digits in this example. In the instructions, R1-R7 refer to processer registers 102c, and data contained in square brackets ("[ ]") refer to a memory location (e.g., in the data portion of the cache 102b).

Table 2 illustrates a sequence of instruction execution for the thread, including register state, and sample data that could potentially be recorded in the trace file(s) 108 to enable replay of the thread's execution.

TABLE 2

Instruction Execution Sequence

| ID # | Addr. | R1 0xff | R2 0xff | R3 0xff | R4 0xff | R5 0xff | R6 0xff | R7 0xff | Trace <Initial context> |
|---|---|---|---|---|---|---|---|---|---|
| 0 | 10 | T1 | | | | | | | Instr: 0 <Orderable event, X> Instr: 0 <Side effects, R1 = T1, PC = 11> |
| 1 | 11 | | ptrA | | | | | | Instr: 1 <Read value ptrA> |
| 2 | 12 | | | ptrB | | | | | Instr: 1 <Read value ptrB> |
| 3 | 13 | | | | 5 | | | | Instr: 1 <Read value 5> |
| 4 | 14 | | | | | 0 | | | |
| 5 | 15 | | | | | | 0 | | |
| 6 | Loop: 16 | | | | | | | | |
| 7 | 17 | | | | | | | | |
| 8 | 18 | | | | | | | 5 | |
| 9 | 19 | | | | | 1 | | | |
| 10 | 20 | | | | | | | | |
| 11 | 21 | | | | | | | | |
| 12 | 22 | | | | | | | | |
| 13 | 23 | | | | | | 1 | | |
| 14 | 24 | | | | | | | | |
| 15 | Loop: 16 | | | | | | | | |
| 16 | 17 | | | | | | | | |
| 17 | 18 | | | | | | | 0 | Instr: 14 <Read value 0> |
| 18 | 19 | | | | | 2 | | | |
| 19 | 20 | | | | | | | | |
| 20 | 21 | | | | | | | | |
| 21 | Loop: 16 | | | | | | | | |
| 22 | 17 | | | | | | | | |
| 23 | 18 | | | | | | | 0 | |
| 24 | 19 | | | | | 3 | | | |
| 25 | 20 | | | | | | | | |
| 26 | 21 | | | | | | | | |
| 27 | Loop: 16 | | | | | | | | |
| 28 | 17 | | | | | | | | |
| 29 | 18 | | | | | | | 2 | Instr: 12 <Read value 2> |
| 30 | 19 | | | | | 4 | | | |
| 31 | 20 | | | | | | | | |
| 32 | 21 | | | | | | | | |
| 33 | 22 | | | | | | | | |
| 34 | 23 | | | | | | 2 | | |
| 35 | 24 | | | | | | | | |
| 36 | Loop: 16 | | | | | | | | |
| 37 | 17 | | | | | | | | |
| 38 | 18 | | | | | | | 2 | |
| 39 | 19 | | | | | 5 | | | |
| 40 | 20 | | | | | | | | |
| 41 | 21 | | | | | | | | |
| 42 | 22 | | | | | | | | |
| 43 | 23 | | | | | | 3 | | |
| 44 | 24 | | | | | | | | |
| 45 | Loop: 16 | | | | | | | | |
| 46 | 17 | | | | | | | | |
| 47 | Out: 25 | | T2 | | | | | | Instr: 18 <Orderable event, X + N> Instr: 0 <Side effects, R2 = T2, PC = 26> |
| 48 | 26 | T2-T1 | | | | | | | |

In Table 2, the "ID #" column refers the particular sequences of instruction execution, and the "Addr." column indicates the instruction address (see Table 1) of the instruction executed at the ID #. While not necessarily recorded in the trace file(s) 108, columns "R1"-"R7" are included to illustrate the state changes to some processor registers as an aide in understanding the program execution. The "Trace" column indicates the type of data that may be recorded in connection with an instruction execution.

Per method 200, the record component 106a would identify a trace memory model defining "orderable" and "non-orderable" instructions/events (act 201). This enables the record component 106a to record sequencing (orderable) events across threads according to a MIN. Later, during replay, this enables the reply component 106b to ensure that these orderable instructions are replayed across threads in proper order in relation to each other, and also enables the replay component 106b to have flexibility in replaying non-orderable instructions within and across threads.

Figure 3:
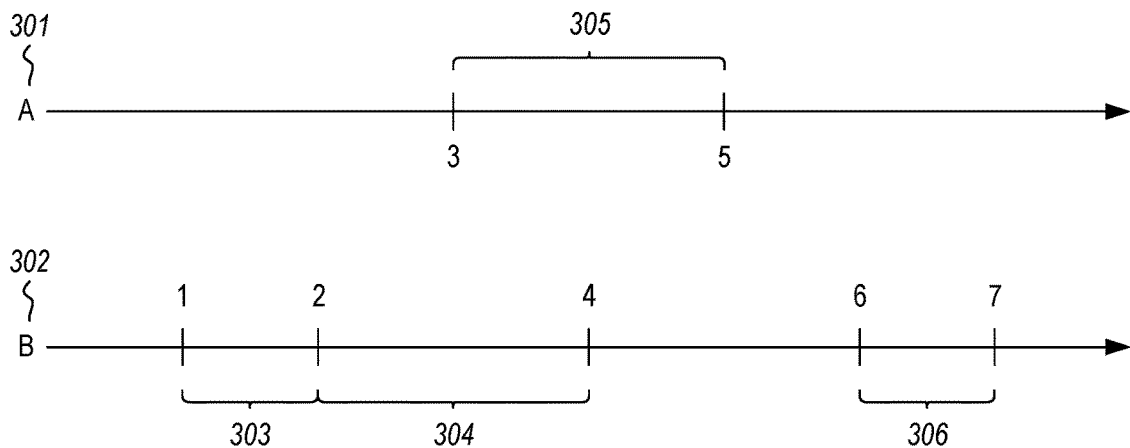
FIG. 3 example of ordering events across concurrently executing threads.

To illustrate, FIG. 3 provides an example 300 of ordering events across concurrently executing threads (threads A and B). In particular, FIG. 3 illustrates a timeline 301 of execution of thread A, and a concurrent timeline 302 of execution of thread B. These timelines 301, 302 show the relative order of execution of seven orderable events. In particular, timeline 301 shows that thread A executed orderable events 3 and 5, and timeline 302b shows that thread B executed orderable events 1, 2, 4, 6, and 7. During replay, the replay component 106b ensures that these orderable events are replayed within their respective thread in proper order, and across the two threads in their proper order (i.e., B1=>B2=>A3=>B4=>A5=>B6=B7).

Non-orderable instructions are replayed relative these orderable instructions. For example, the replay component 106b would replay any non-orderable events in time block 303 of thread B prior to replaying any non-orderable events in the time block 304 of thread B. Additionally, the replay component 106b would replay the non-orderable events in time block 303 of thread B prior to replaying any non-orderable events in time block 305 of thread A. Furthermore, the replay component 106b would replay the non-orderable events in time block 305 of thread A prior replaying any non-orderable events in time block 306 of thread B. However, the reply component 106b may not enforce any particular ordering between replay of the non-orderable events in time block 305 of thread B and replay of the non-orderable events in time block 304 of thread B, since that ordering cannot be determined based on the orderable events alone. However, the replay component 106b may enforce some ordering between these instructions if they were to both access shared memory, since their ordering could be determined, at least partially, based on how and when they access the shared memory (including the values accessed).

Retuning to FIG. 2, method 200 would proceed to record an individual trace for each thread (act 203). Prior to executing any instructions for a given thread, the record component 106a records initial state/context (act 204), such as the initial values of the processor registers 102c (i.e., all 1's (0xff) for each of R1-R7, in this example).

The record component 106a then proceeds to monitor and record execution of the thread, recording in the trace file(s) 108 appropriate instructions/events as the occur, such as the side effects of the execution of non-deterministic instructions (act 205), memory reads (act 206), and orderable events (act 207).

For example, at ID #0, the record component 106a records execution of the instruction at address 10 (i.e., "Move R1<-{Timer}" per Table 1). This instruction reads a timer, and places the value in a register (R1). In this example, assume that the chosen trace memory model (act 201) defines getting the timer as an "orderable" instruction which we should record with a MIN. As such, the record component 106a records the sequencing (orderable) event "X" in the trace file(s) 108 (act 207). In the example, this is notated in the "Trace" column as "Instr: 0 <Orderable event, X>," meaning that zero instructions since the last data written to the trace, record the sequencing (orderable) event identified by the MIN X.

Note that the particular notation (MIN) for recording sequencing (orderable) events can be any notation (hence the use of the generic "X"), so long as it is a value that is guaranteed not to repeat within the same recording, and is monotonically incrementing (e.g., A, B, C, etc.; 1, 2, 3; etc.; 10, 20, 30, etc.). One possible option is to use a processor-provided timer value, such as the value retuned by the RDTSC instruction on INTEL processors. Thus, operations that happen later than "X" will have a sequence identifier that is strictly greater than "X" no matter which thread those operations took place on.

Additionally, instruction 10 is the first category of non-deterministic instructions, which produce results that do not depend only on inputs (e.g., there is no input, and the timer value returned with be different each time the instruction is executed). As such, the record component 106a records the side effects of its execution in the trace (act 205). In the example, this is notated in the "Trace" column as "Instr: 0 <Side effects, R1=T1, PC=11>," meaning that zero instructions since the last data written to the trace (which was "Instr: 0 <Seq. event, X>"), record the new value of R1 (which is time T1), and increment and record the program counter (PC, not shown) register (i.e., to the next instruction at address 11).

While this example records updates to the PC as a side effect, some embodiments may omit doing so, since the replay component 106b would be able to determine how far the PC should be incremented based on analysis of the instruction executed. However, recoding the PC allows "jump" instructions to be recorded as side effects, which offers the opportunity to record the execution of several instructions with a single entry to the trace file(s) 108.

At this point, the trace file(s) 108 have enough information that the replay component 106b could set up initial thread state (e.g., set the values of R1-R7 to 0xff), could replay instruction 10 (by reproducing its side effects), and could order instruction 10 against any other instructions within this thread, or within other threads that the record component 106a is track the ordering of that are executing concurrently.

Next, at ID #1, instruction 11 performs a read (a read the address of memory location A, and place the value in R2, see Table 1). Since this instruction reads memory, the record component 106a records this to the trace file(s) 108 (act 206) in such a manner that at replay time the replay component 106b can reproduce or predict the value that was read. As discussed previously, this could include the record component 106a recording the value of every read, though there are various optimizations to reduce the amount of data that needs to be written. One approach is to predict that the value read by the current instruction is the value that was last read by the thread (and recorded in the trace file(s) 108). In this case, the trace file(s) 108 contain no previous reads for this thread, so the read needs to be recorded. In the example, this is notated as "Instr: 1 <Read value ptrA>" meaning that one instruction since the last data written to the trace (i.e., "Instr: 0 <Side effects, R1=T1, PC=11>"), read the address of memory location A. As indicated, this address (ptrA) would be placed by the instruction into R2.

The instructions executed at ID #'s 2 and 3 (instructions 12 and 13) also need to be recorded, since they are also reads (act 206). The data recorded in the trace file(s) 108 by the record component 106a is similar to that which was recorded for instruction 11. For ID #2 (instruction 12) the notation "Instr: 1 <Read value ptrB>" means that one instruction since the last data written to the trace, read the address of memory location B. For ID #3 (instruction 13) the notation "Instr: 1 <Read value 5>" means that one instruction since the last data written to the trace, read the value 5. Note that, per the example prediction algorithm, both of these would need to be written to the trace file(s) 108, since each read produces a different value than the previous read. As indicated, the address for location B (ptrB) would be placed by instruction 12 into R2, and the value 5 would be placed by instruction 13 into R4.

For ID #'s 4 and 5, instructions 14 and 15 are deterministic, with no reads from memory, so the record component 106a does not need to record anything in the trace file(s) 108. Similarly, for ID #6, instruction 16 is deterministic and depends only on the values of R5 and R4. No recording in the trace file(s) 108 is necessary, as those values will be reproduced by the replay component 106b based on replay of instructions 13 and 14, together with the trace data for the instruction at ID #3.

For ID #7, instruction 17 also doesn't require any trace data to be recorded, since its behavior (to not take the jump, since the value of R5 is not less than the value of R4) is fully determined by data already recorded (or implicit) in the trace file(s) 108. For example, at replay time, the trace data for ID #3 would case the replay component 106b to place a value of 5 in R4, and the value of zero would have been written to R5 based on replaying instruction 14 at ID #4.

For ID #8, instruction 18 is a read from memory (the memory location identified by [R2+R5]), and should therefore be considered for recording (act 206). Assume that a value of 5 was observed by the record component 106a to have been read during execution (as indicated in column "R7"). While the record component 106a could record this read in the trace file(s) 108 (e.g., "Instr: 5 <Read value 5>"), it can avoid doing so by applying the read prediction algorithm discussed above: if the value read is the same as the value from the least read operation by the thread, do not record it. In this case, the last value read was 5 (ID #3), so the record component 106a does not need to record anything in the trace file(s) 108 for ID #8.

For ID #'s 9-11, the record component 106a also does not need to record anything to be able to replay instructions 19-21, since everything needed to execute these instructions is already known. For ID #12 (instruction 21) the record component 106a also does need to record anything, since this instructions' input is only a register, and since writes to memory (i.e., the location identified by [R3+R6]) do not need to be recorded—as discussed previously, while reads from memory affect how and which instructions executed, writes do not. The record component 106a also does not need to record anything for ID #'s 12-16 (instructions 23, 24, Loop: 16, and 17), since everything needed to execute these instructions is already known.

For ID #17, the second time instruction 18 (a read from memory) is encountered, the value of 0 is read (as indicated in column "R7"). This value is not the value that would be predicted by the record component 106a using the sample prediction algorithm (since it is different than the last value of 5 that was read) so the record component 106a adds it to the trace file(s) 108 per act 206 (e.g., "Instr: 14 <Read value 0>," indicating that fourteen instructions after last data logged, read the value of zero).

The record component 106a doesn't need to add anything to the trace file(s) 108 for ID #'s 18-22 (instructions 18, 20, 21, Loop: 16, and 17). As before, the replay component 106b would already have enough information to reproduce the same results as record component 106a observed. At replay, the replay component 106b would compare the same values, take the same jumps, etc.

ID #23 is the third time instruction 18 (a read from memory) is encountered, and another 0 (as indicated in column "R7") is read. While the record component 106a needs to consider adding it to the trace file(s) 108 (act 206), this value was predicted by the prediction algorithm (the last read was also a 0 at ID #17), so the record component 106a doesn't record anything into the trace file(s) 108.

Again, the record component 106a doesn't need to record anything to the trace file(s) 108 for ID #'s 24-28 (instructions 19, 20, 21, Loop: 16, and 17), since the replay component 106b would already have enough information to reproduce the same results.

For ID #29, the fourth time instruction 18 (a read from memory) is encountered, a value of 2 (as indicated in column "R7") is read. This value is not the predicted value (it is different than the last value we read, which was 0) so the record component 106a adds it to the trace file(s) 108 per act 206 (twelve instructions since the last entry, read a value of 2).

The record component 106a also doesn't need to add anything to the trace file(s) 108 for ID #'s 30-37 (instructions 19, 20, 21, 22, 23, 24, Loop: 16, and 17). Again, the replay component 106b would already have enough information to reproduce the same results.

ID #38 (instruction 18) is another memory read (from location [R2+R5]). As indicated in R7, a value of 2 was read, which is the same as last read at ID #29. While the record component 106a needs to consider writing it to the trace file(s) 108 (act 206), it does not need to do so per the prediction algorithm.

The record component 106a also doesn't need to add anything to the trace file(s) 108 for ID #'s 39-46 (instructions 19, 20, 21, 22, 23, 24, Loop: 16, and 17). Again, the replay component 106b already has enough information to reproduce the same results the record component 106a observed.

At ID #9, the record component 106a observes another timer read at instruction 26. Since this is an "orderable" event per our memory model (as discussed in connection with ID #0), the record component 106a records the sequence/order of the operation with an incremented identifier per act 207 (e.g., data stating that eighteen instructions after the last logged data, the sequencing event X+N occurred). Also, since this is a non-deterministic instruction, the record component 106a records its side effects per act 205 (e.g., data stating that zero instructions after the last logged data, record the effects: R2=T2, and PC=26).

For ID #48, there are no reads and the instruction is deterministic, so the record component doesn't log anything in the trace file(s) 108.

Table 3 summarizes an example of the trace data that the record component 106a may have recorded in the trace file(s) 108 as part of tracing execution of this thread.

TABLE 3

Example Trace with Prediction

<Initial context (e.g., registers)>
Instr: 0 <Orderable event, Id X>
Instr: 0 <Side effects, R1=T1, PC=11>
Instr: 1 <Read value ptrA>
Instr: 1 <Read value ptrB>
Instr: 1 <Read value 5>
Instr: 14 <Read value 0>
Instr: 12 <Read value 2>
Instr: 18 <Orderable event, Id: X+N>
Instr: 0 <Side effects, R2=T2, PC=26>

The replay component 106b can later use this trace data to set up initial context (e.g., register state) and then, together with the thread's code (e.g., Table 1), execute the same instructions in the same manner that they executed at record time, by reproducing the side effects of non-deterministic instructions, and supplying memory values when needed (using knowledge of the prediction algorithm used during the recording). Additionally, the sequencing events (X and X+N) enable the instructions at ID #'s 0 and 47 to be executed in the same order relative to sequencing events in other threads as they executed during record time. Thus, the tracing mechanisms enable the tracing and replay of both individual and multiple concurrently executing threads, while recording a small amount of trace data—and much less than a fully deterministic record in the instructions executed and full memory state. Notably, in the foregoing example, the record component 106a did not track or record when, why, or who (i.e., another thread in this process, the same thread earlier, another process, the kernel, hardware, etc.) wrote the values that were read and consumed by the code in Table 1. Nonetheless, the replay component 106b is still enabled by the trace Table 3 to replay execution of in the exact manner that it was observed.

As one of skill in the art will recognize, in view of the disclosure herein, there are many variations on the particular manner in which the trace data may be recorded. For example, while the example trace tracks when an event took place based on an instruction count that is relative to the number of instructions executed since the previous entry into the trace, an absolute instruction count (e.g., a count starting at the beginning of the trace) could also be used. Other examples that could be used to uniquely identify each instruction executed may be based on a count of a number of CPU cycles executed (either relative to a prior entry, or as an absolute value), a number of memory access made, and/or a jump taken count together with the processor's program counter (which could be relative to the last execution discontinuity or kernel call, or absolute from a defined time). When using one more of the foregoing techniques, care may need to be taken when recording certain types of instructions, such as "repeat" instructions (e.g., REP on INTEL architectures). In particular, on some processors a repeat instruction may actually execute with the same program counter on each iteration, and thus on these processors a repeat instruction with multiple iterations may count only as one instruction. In these circumstances, the trace should include information can be used to distinguish each iteration.

Additionally, there are various mechanisms for recording and predicting the values read. As one simple example, embodiments may eliminate the prediction algorithm altogether. While this would generate a longer trace, it would also remove the restriction that the replay component 106b be configured with the same prediction algorithm as the record component 106a. Table 4 illustrates what the trace may look like without use of a prediction algorithm, and in which each memory read is recorded. As shown, without the prediction algorithm, the trace would include three new entries (shown with emphasis), while other entries (i.e., those following each new entry) each have an updated with instruction count that reflect count from the new entry that precedes it.

TABLE 4

Example Trace without Prediction

<Initial execution context (e.g., registers)>
Instr: 0 <Orderable event, Id X>
Instr: 0 <Side effects, R1=T1, PC=11>
Instr: 1 <Read value ptrA>
Instr: 1 <Read value ptrB>
Instr: 1 <Read value 5>
Instr: 5 <Read value 5>
Instr: 9 <Read value 0>

TABLE 4-continued

Example Trace without Prediction

Instr: 6 <Read value 0>
Instr: 6 <Read value 2>
Instr: 9 <Read value 2>
Instr: 9 <Orderable event, Id: X + N>
Instr: 0 <Side effects, R2=T2, PC=26>

Note that the trace file(s) 108 need not record the memory address of the values read, if it can map them based on which instruction consumed them. Thus, instructions that produce more than one read may require a means to identify which read is the one in the trace file(s) 108 (i.e., when there is only one read for that instruction), or which read is which (i.e., if there are several in the trace file(s) 108). Alternatively, the trace file(s) 108 could contain the memory address for these reads or for all reads. The trace file(s) 108 just need to include enough information for the replay component 106b to be able to read the same values that the record component 106a observed, and match them to the same parameters so it can produce the same results.

Additionally, events (i.e., discontinuities in code execution) may occur that are not discoverable in the code stream, such as access violations, traps, interrupts, calls to the kernel, etc. The record component 106a also needs to record these events so that they can be replayed. For example, Table 5 illustrates an example trace that may be recorded in the trace file(s) 108 if ID #33 (instruction 22) had generated an access violation.

TABLE 5

Example Trace with Exception

<Initial execution context (e.g., registers)>
Instr: 0 <Orderable event, Id X>
Instr: 0 <Side effects, R1=T1, PC=11>
Instr: 1 <Read value ptrA>
Instr: 1 <Read value ptrB>
Instr: 1 <Read value 5>
Instr: 14 <Read value 0>
Instr: 12 <Read value 2>
Instr: 4 <Exception record>
Instr: 0 <Exception context>
<end-of-trace>

In particular, the trace contains "Instr. 4 <Exception record>," signaling that an exception occurred and that the exception happened 4 instructions after the last entry into the trace, and "Instr: 0 <Exception context>," which resets the instruction count to zero in connection with restarting execution after the exception and recording any appropriate state. While, for clarity, Table 5 shows separate records for signaling the occurrence of an exception and for recording the exception context, they could be in the same entry. Setting the instruction count to zero signals to the replay component 106b that the two entries apply to the same instruction. Now, since the trace files(s) 108 contain an entry for an exception, the trace has a precise location for such an exception. This enables the replay component 106b to raise the exception at the same point in execution that it was observed a record time. This is important, because exceptions are not inferable by looking at the code stream (since their occurrence is often based on data not present in the code stream).

As mentioned above, various mechanisms for tracing the values read may be employed by the record component 106a, such as predicting that the value that will be read equals the last value read, and recording the read in the trace file(s) 108 if the values are different. One alternative approach to extend this prediction algorithm using a cache, so that that the record component 106*a* predicts that the most likely value to be read from a particular address is the last value that was read from or written to that address. Thus, this approach needs to maintain a cache of the memory range of a process, and use the cache to track memory reads and writes.

In order to avoid overhead of this approach (i.e., keeping a cache that tracks of the last value placed in the entire memory range of a program), one refinement is for the record component 106*a* to create a "shadow copy" of a much smaller amount of memory than the full memory that is addressed (as discussed below). Then, for each read observed, the record component 106*a* compares the value the instruction read with that of the matching position at the shadow copy. If the values are the same, there is no need for the record component 106*a* to save a record of the read in the trace file(s) 108. If the values are different, then the record component 106*a* records the value into the trace file(s) 108. The record component 106*a* can update the shadow copy on reads and/or on writes to increase the likelihood of predicting the value correctly the next time the memory location is read.

In some embodiments, the size of the shadow copy could be defined as $2^N$ addresses. Then, to match an address to its shadow copy, the record component 106*a* takes the low N bits of the memory address (i.e., where N is the power of 2 that determined the size of the shadow copy). For example, with a value of N=16, the shadow copy would be 64 k ($2^{16}$) addresses, and the record component 106*a* takes the low 16 bits of each memory address, and compares them with that offset in the shadow copy. In some embodiments, the shadow copy is initialized with all zeros. Zeros may be chosen because it is an unambiguous value, and because zeroes are read quite frequently from memory. However, other choices of initial values may alternatively be used depending on the implementation.

Figure 4:
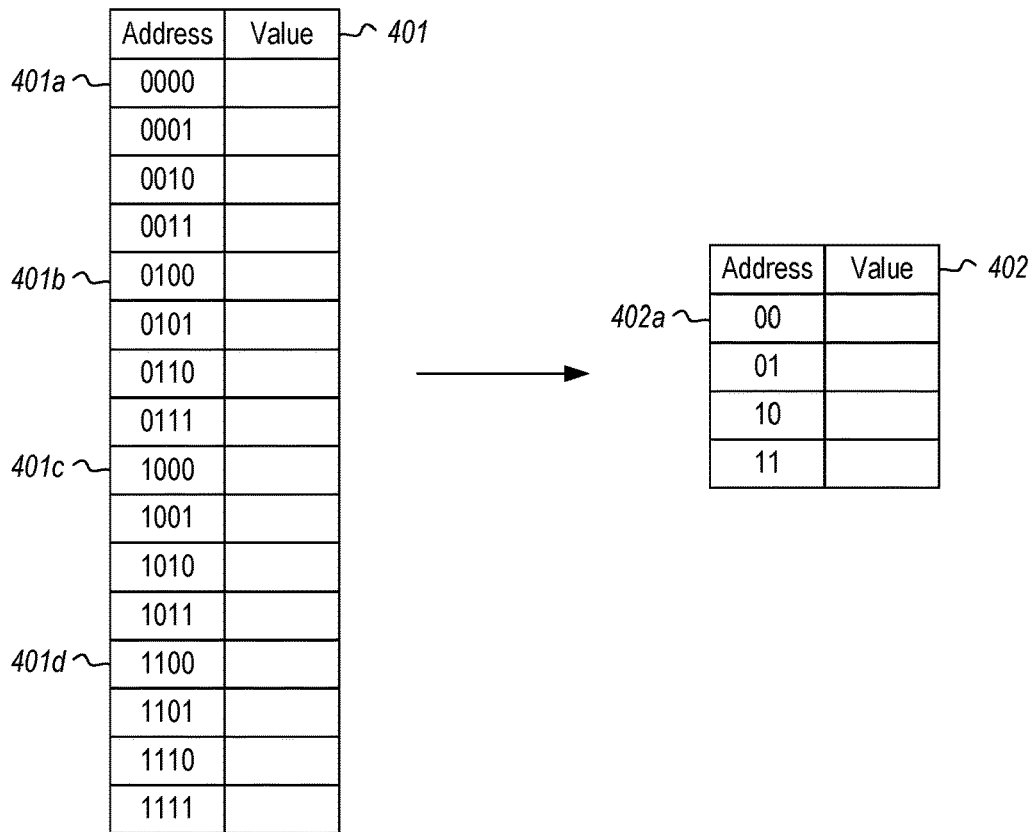
FIG. 4 illustrates an example of use of a shadow copy.

FIG. 4 illustrates an example 400 of use of a shadow copy, according to some embodiments. FIG. 4 represents addressable memory 401 of a process. For simplicity in illustration, the process in the example 400 only can address $2^4$ (sixteen) memory locations, which is only a fraction of what a typical process would be able to address on contemporary computers (which would typically be on the order of $2^{32}$, $2^{64}$, or more, memory locations). In the representation of the addressable memory 401, the address column specifies the binary address of each memory location (i.e., binary addresses 0000-1111), and the value column represents a location for data to be stored at each memory location. In accordance with the shadow copy described above, FIG. 4 also represents a corresponding shadow copy 402 of the addressable memory 401 that may be kept by the record component 106*a* during tracing of a thread. In the example, the value of N equals two, so the shadow copy 402 stores $2^2$ (four) memory locations (i.e., binary addresses 00-11).

Any time the record component 106*a* detects a read from the addressable memory 401, the record component 106*a* compares the value read from the addressable memory 401 with the corresponding location in the shadow copy 402. For example, when any of memory locations 401*a*, 401*b*, 401*c*, or 401*d* are read (i.e., binary addresses 0000, 0100, 1000, or 1100), the record component 106*a* compares the value read from that location to the value in location 402*a* of the shadow copy (i.e., binary address 00, because the last N digits of each of the foregoing memory addresses is 00). If the values match, then the read need not be recorded in the trace file(s) 108. If the values do not match, the record component 106*a* records the read in the trace file(s) 108, and updates the shadow copy with the new value.

Even though each location in the shadow copy 402 represents multiple locations in the addressable memory (four, in this case), it is noted that most programs are likely to perform multiple reads from and/or writes to the same location in the addressable memory (e.g., to read or update a variable value), so there are likely to be a high number of reads that are predicted by the shadow copy 402. In some embodiments, the record component 106*a* may also update the shadow copy 402 when writes occur, which may further increase the likelihood of a correct prediction.

In some embodiments, rather than tracking memory reads at the finely-grained level of memory addresses, the record component 106*a* may track reads across multiple threads at the memory page level (e.g., based on page tables). This embodiment is built on the recognition that memory pages are restricted, such that each page of memory can either (i) be written to by one thread, with no other thread having read or write access to the page; or (ii) be read by as many threads as need, but no thread can write to it. Embodiments may therefore group threads into families such that, during record time, the threads within one family always execute non-concurrently among each other (i.e., no two threads of the same family can execute at the same time). Then, the restrictions mentioned above are applied across the thread families—such that, other than concurrent page access, threads of different thread families can run concurrent to each other. If a thread family "owns" a page for writing, then no other thread family can have access to it; however, one or more thread families can share a page for reading.

When a thread family accesses a page for either reading or writing it needs to know the entire contents of the page. If the page was produced/written to by a thread in a thread family that is already being recorded, the record component 106*a* is aware of the page's contents already. Thus, in some embodiments, the record component 106*a* only puts information on the trace identifying the point in the recording that the writing thread released the page. For pages that have been produced/written to by external entities (e.g., the kernel, threads not being traced, a hardware component, etc.) strategies for recording the page so that it is available at replay time may include the record component 106*a* recording the entire page, or the record component 106*a* recording a compressed version of the page. If the page has been previously recorded, another strategy includes the record component 106*a* storing only a difference in page values between the current version of the page and the prior recording.

As indicated previously, when debugging code traced by the record component 106*a*, a breakpoint in the "backwards" direction is reached by the replay component 106*b* replacing the trace file(s) 108 from a time prior to the breakpoint until the breakpoint is reached (e.g., the last time that breakpoint hits that is before where the debugger is currently analyzing the code stream). Using the traces described above, this would mean replaying the trace from the beginning of the trace file(s) 108. While this may be acceptable for smaller traces, it could be time-consuming an inefficient for larger traces. In order to improve the performance of replay, in some embodiments, the record component 106*a* records a plurality of "key frames" in the trace files 108. Then, the key frames are used by the replay component 106*b* to more granularly "zero in" on the breakpoint. For example, in some implementations the replay component 106*b* may iteratively "go back" an increasing number of key frames (e.g., doubling the number of key frames each iteration) until the chosen break point is reached. To illustrate, the replay component may go back one key frame and try to hit the breakpoint, if that fails it may go back two key frames and try to hit the breakpoint, if that fails it may go back four key frames and try to hit the breakpoint, etc.

Generally, key frames include enough information that the replay component 106b can replay execution starting at the key frame, generally without regard for what came prior to the key frame in the trace. The exact timing of recording key frames, and data collected, may vary based on implementation. For example, at periodic intervals (e.g., based on the number of instructions executed, based on processor cycles, based on elapsed clock time, based on the occurrence of "orderable" events according to the trace memory model, etc.) the record component 106a may record in the trace files(s) 108 for each thread a key frame enough information to begin replay of the trace of each thread from the key frame. This information may include the state of the hardware registers at the time that that the key frame was taken. This information also may include any information needed to put the memory prediction tactic to a known state, so that it can reproduce reads starting at the key frame (e.g., by recording memory snapshot(s), shadow copy(s), the last value(s) read, etc.). In some embodiments, key frames are usable to enable gaps in a trace. For example, if tracing is stopped for any reason this can be noted in the trace file(s) 108 (e.g., by inserting a notation that tracing was stopped and an appropriately formatted key frame), and tracing can then be restarted later from that point in the trace file(s) 108.

In some embodiments, some key frames may include information that may not be strictly necessary to enable replay at the key frame, but that nonetheless proves useful during debugging (e.g., to help the time travel debugger 106 consume the data generated during replay, and present it in a useful form). This information may include, for example, a copy of the one or more portions of the thread's stack, a copy of one or more portions of memory, the thread's TEB, the process' PEB, the identity of loaded modules and their headers, etc. In some embodiments, key frames that include this additional information (e.g., "full" key frames) may generated and stored less frequently than regular key frames (e.g., "lightweight" key frames). The frequency of the gathering of lightweight key frames and/or full key frames, and the particular data collected in each, may be user-configurable at record time.

In some embodiments, recording "full" key frames also can be useful for features such as a reusable ring buffer, which is discussed below in connection with FIG. 5. Recording "lightweight" key frames also enables the replay component 106b to parallelize replay; each thread trace following a key frame can be replayed independently from other threads, and hence in parallel. Additionally, key frames can enable the replay component 106b to replay different segments of the same thread trace in parallel. For example, doing so may be useful more quickly hit a breakpoint using the time-travel debugger 106. In some embodiments, the recording of "full" key frames is coordinated across threads (i.e., the record component 106a records a full key frame for each thread of a process at approximately the same time), while "lightweight" key frames are recorded for each thread independent of other threads (i.e., the record component 106a records lightweight key frames for each thread which it is convenient or otherwise makes sense for that thread). Adjusting the conditions for recording different types of key frames provides flexibility to balance trace size, replayability, record performance, and replay performance.

Some embodiments may include the use of "snapshots," which comprise a full copy of relevant memory of a process. For example, the record component 106a may take an initial snapshot of a process' memory when beginning a trace of that process. This enables the replay component 106b to provide a user of the time-travel debugger 106 with the values of all of the memory locations used by the process, instead of only those that were observed to be accessed during recording.

In some embodiments, the trace file(s) include information that is usable to by the replay component 106b validate that the state of the program at replay indeed matches the program state that existed during recording. For example, the record component 106a may include in the trace file(s) 108 periodic information such as copy register data and/or a computed hash of the register data. This information may be included in key frames, may be periodically included with standard trace entries, and/or may be included based on a number of instructions executed (e.g., placed in the trace every X instructions), etc. During reply, the replay component 106b can compare the recorded register data (and/or the computed hash) at corresponding points in the execution state data generated during replay to ensure the execution state is the same (i.e., if the register data during replay and/or a computed hash of this data match, the execution state is likely the same; if they do not match, the execution state has deviated).

As alluded to previously, some embodiments include recording trace file(s) comprising a "ring buffer" of limited capacity. In particular, a ring buffer records only a trailing portion of program execution (e.g., the last N minutes, hours, days, etc. of execution). In concept, a ring buffer adds new trace data to the front/top of the trace, and removes old trace data from the back/bottom of the trace. For example, some applications may run for days, weeks, or even months/years before a programming bug manifests. In such situations, it may be impractical (e.g., in terms of the amount of disk space used) and unnecessary to trace a full history of program execution, even with the compactness of the trace files recorded by the disclosed embodiments. Additionally, use of a ring buffer could potentially allow the entire trace file(s) 108 to be stored in RAM, which can greatly reduce disk I/O and improve performance (both during record and replay).

When implementing a ring buffer, embodiments may track both "permanent" trace information and "temporary" trace information, with the "temporary" information being stored in the ring buffer. Examples of "permanent" trace information may include general information, such as the identity of loaded modules, the identity of the process being recorded, etc.

Figure 5:
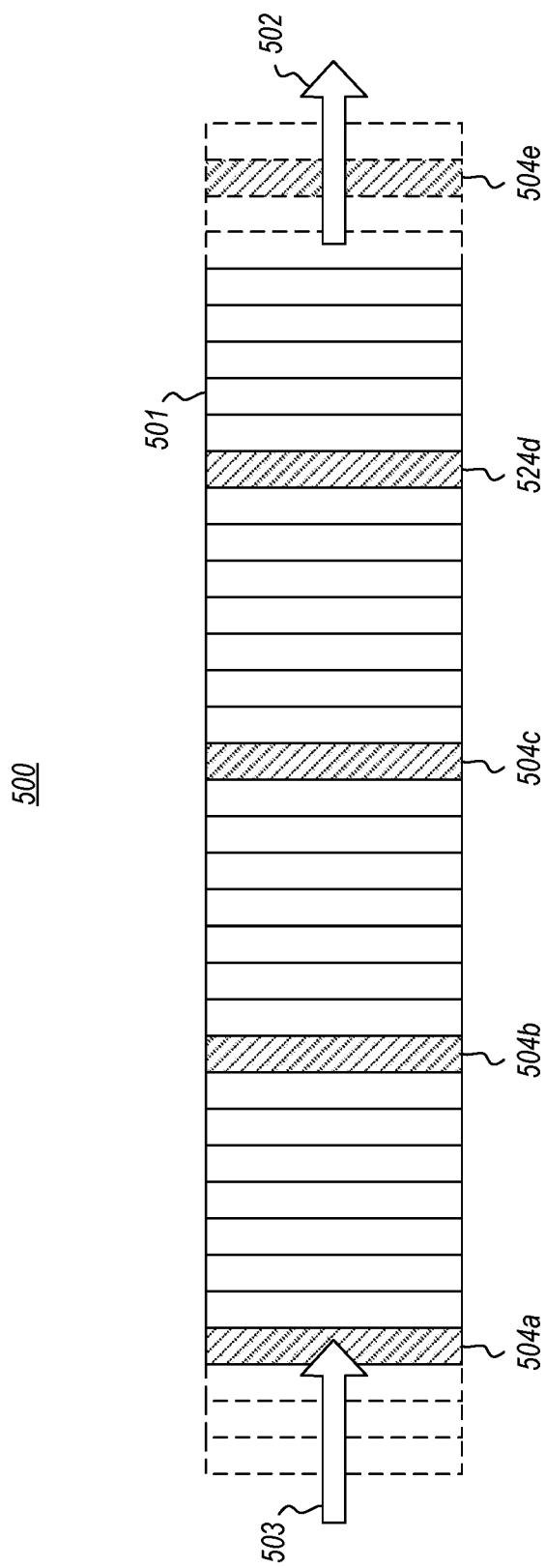
FIG. 5 illustrates an example of a ring buffer.

FIG. 5 illustrates an example 500 of a reusable ring buffer 501 according to one or more embodiments. In the example, each clear rectangle in the ring buffer 501 represents a standard trace entry in the ring buffer 501 (e.g., such as the entries of Table 3 above). Each shaded rectangle (e.g., 504a, 504b, 504c, 504d, 504e) represents a key frame. The frequency of key frames, and the number of entries between key frames, will vary based on implementation. As indicated by the arrow 502 and the dashed entries it overlays, new entries (both standard entries and key frames) are added to one end of the buffer. As indicated by the arrow 503 and the dashed entries it overlays, the oldest existing entries (both standard entries and key frames) are removed from the other end of the buffer. Entries can be added/removed on a one-by-one basis, or in chucks (e.g., based elapsed time, a number of entries, the occurrence of a key frame, etc.). The overall size of the buffer is configurable based on how long the desired length of the trailing period of program execution. To replay from the ring buffer 501, the replay component 106*b* initializes state data using a desired key frame, and then replays program execution from there.

As alluded to previously, the key frames of the ring buffer 501 may comprise "full" key frames, which enables not only replay by the replay component 106*b* from each key frame on (e.g., using register values stored in the key frame), but also the use of additional debugging features from each key frame on (e.g., using additional information such as a thread's TEB, data caches, etc.). However, the key frames of the ring buffer 501 may also comprise "lightweight" key frames—either exclusively or in addition to "full" key frames.

The number of ring buffers used during recording may vary. For example, some embodiments may use a separate ring buffer per-thread (i.e., each thread is allocated a number of memory pages for recording trace data), while other embodiments may use a single ring buffer to record multiple threads. When using a single ring buffer, a trace of each thread is still recorded separately, but the threads record to a shared pool of memory pages.

In the second embodiment (using single ring buffer to trace a plurality of threads), each thread may obtain one page from a pool of pages allocated to the ring buffer, and start filling it with trace data. Once a thread's page is full, the thread can allocate another page from the pool. When adding key frames, some embodiments attempt to add them at approximately the same time for each of the threads. The key frames may then be used to assign a "generation" to the recordings. For example, data recorded prior to a first key frames may be "generation one" recordings, and data recorded between the first key frames and a second key frames may be "generation two" recordings. When the pages in the pool have been exhausted, the pages associated with the oldest generation of recordings (e.g., generation 1) may be released to be re-used for future recordings.

While the forgoing disclosure has focused primarily on recording to the trace file(s) 108 information usable to replay execution of code, that there are many other types of data that may be helpful for the record component 106*a* to write into the trace file(s). Examples have already been given of writing key frames and additional debugging information to the trace. Other types of information that the trace my tagged with may include timing information, performance counters (e.g., cache misses, branch miss-predicts, etc.) and records of events that do not directly impact replay of the trace—but that nonetheless may help with synchronization (e.g., embedding data capturing when a user interface was captured, so this can be reproduced at replay time). Furthermore, when user mode code is being traced, the record component 106*a* could tag the trace file(s) 108 with information such as: (i) when a user mode thread is scheduled in or out, (ii) when a user mode thread is suspended, (iii) when a user switched focus on an application be traced, (iv) a record of an messages the application received, (v) when a user mode process caused a page fault, etc. One of ordinary skill in the art will recognize, in view of the disclosure herein, that the particular manner for recording any of the foregoing may vary based on implementation.

The time-machine debugger 106 may be implemented as a software component in various forms. For example, at least one or more portions (e.g., the record component) of the time-machine debugger 106 may be implemented as a code portion that is injected into runtime memory of the process being recorded (i.e., "instrumenting" the processes being recorded), as an operating system kernel component, as part of a full machine emulator (e.g., BOCHS, Quick Emulator (QEMU), etc.), and/or as part of a hypervisor (e.g., HYPER-V from MICROSOFT, XEN on LINUX, etc.). When implemented as part of an emulator or hypervisor, the time-machine debugger 106 may be enabled to trace the execution of an entire operating system. Thus, the time-machine debugger 106 can trace execution of user mode code (e.g., when implemented as injected code or as part of a kernel), and/or trace execution of kernel mode code—and even an entire operating system (e.g., when implemented as part of a hypervisor or emulator).

Processor Cache Based Implementation

While the time-machine debugger 106 may be implemented entirely in software, some embodiments include a hardware cache-based recording model that can further decrease the overhead associated with recording execution of a program. As before, this model is built upon the general principle that the record component 106*a* needs to create a record (i.e., trace file(s) 108) that enables the replay component 106*b* to replay each instruction executed at record time in proper order, and in a manner such that each instruction produces the same outputs that it did at record time. As is clear in view of the disclosure above, a significant component of the trace file(s) 108 comprises data usable to reproduce memory reads at replay time. As discussed above, embodiments of recording such data can include recording each value read, using a prediction algorithm to anticipate the values read, using shadow copies of memory, recording memory pages and/or page table entries, etc.

Figure 6:
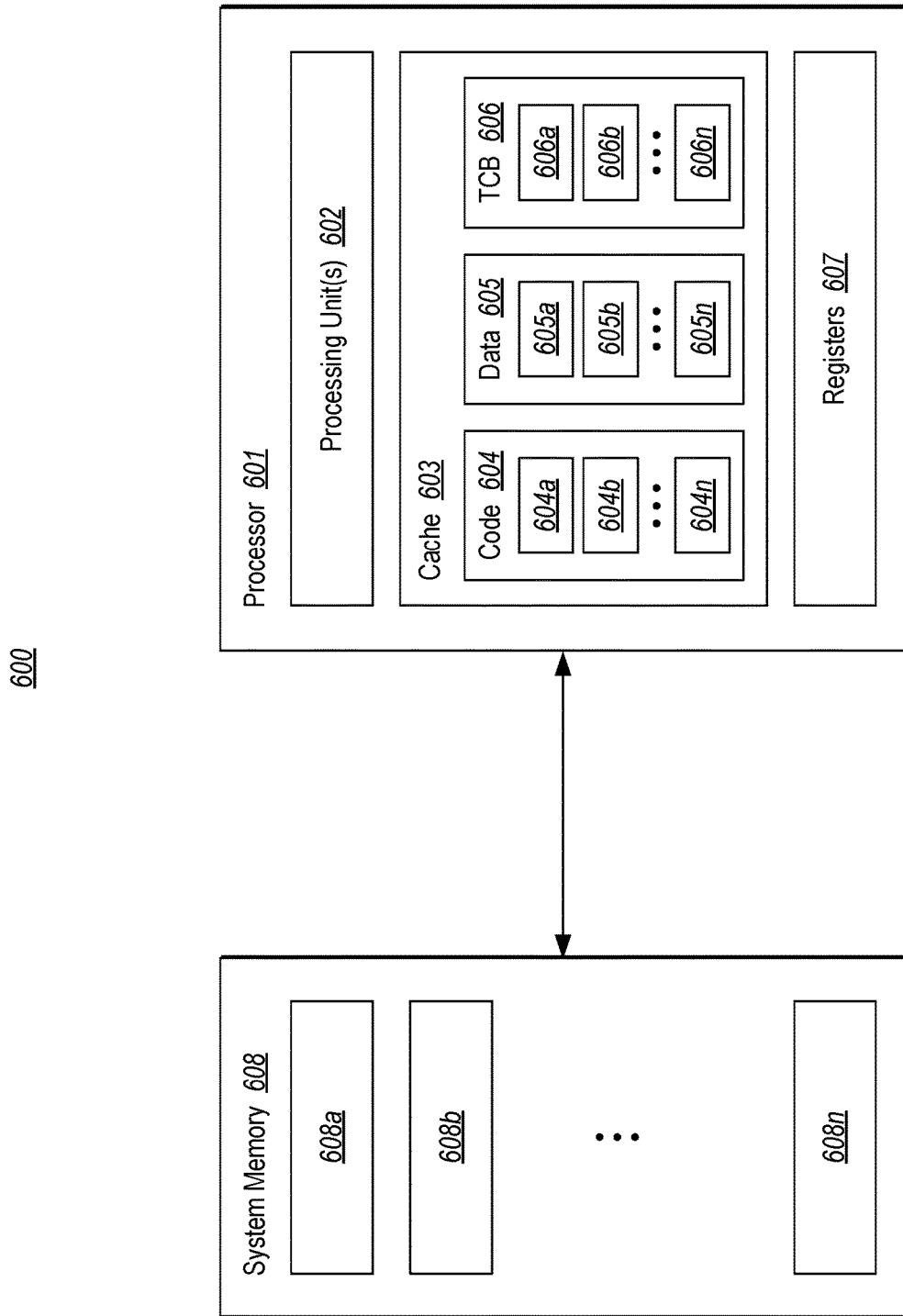
FIG. 6 illustrates an example computer architecture for processor cache based tracing.

Embodiments of the hardware cache-based model for tracing (including recording/reproducing memory reads) are built upon an observation that the processor 102 (including the cache 102*b*) form a semi- or quasi-closed system. To further illustrate, FIG. 6 illustrates an example computer architecture 600 for processor cache based tracing, which includes a processor 601 and system memory 608, which may map to the processor(s) 102 and system memory 103 of FIG. 1.

At a conceptual level, once data is loaded into the cache 603, the processor 601 can run by itself—without any input—as a semi- or quasi-closed system for bursts of time. In particular, during program execution each processing unit 602 executes instructions from a code cache 604 section of the cache 603 using data stored a data cache 605 portion of the cache 605 and using the registers 607. For example, FIG. 6 illustrates that the code cache 604 includes a plurality of storage locations 604*a*-604*n* (e.g., cache lines) for storing program code, and that the data cache 605 includes a plurality of storage locations 605*a*-605*n* (e.g., cache lines) for storing data. As discussed previously in connection with FIG. 1, a cache may include a plurality of layers (e.g., level 1, level 2, and level 3, etc.). While the cache 605 is depicted for simplicity in description as being within the processor 601, it will be appreciated that one or more portions of the cache 605 (e.g., level 3 cache) may actually exist outside of the processor 601.

When the processing unit 602 needs some influx of information (e.g., because it needs code or data not already in the cache 603), a "cache miss" occurs and that information is brought into the cache 603 from an appropriate storage location (e.g., 608*a*-608*n*) of the system memory 608. For example, if a data cache miss occurs when an instruction performs a memory operation at the memory address corresponding to location 608*a* (containing program runtime data), that memory (i.e., the address and the data stored at the address) is brought into one of the storage locations (e.g., location 605a) of the data cache 605. In another example, if a code cache miss occurs when an instruction performs a memory operation at the memory address corresponding to location 608b (containing program code); that memory (i.e., that address and the data stored at the address) is brought into one of the storage locations (e.g., location 605a) of the code cache 604. When new data is imported to the cache 603, it may replace information already in the cache 603. In this case the old information is evicted back to the it proper address in the system memory 608. The processing unit 602 then continues execution using the new information in the cache 603 until another cache miss occurs and new information is again brought into the cache 603.

Thus, embodiments of the hardware cache-based model for recording/reproducing memory reads rely on the realization that, except for accesses to un-cached memory (e.g., reads to hardware components and un-cacheable memory, as discussed later), all the memory accesses that a process/thread performs during execution are performed through the processor cache 603. As a result, rather than creating a record (e.g., a record of each read, a shadow copy, etc.) that can reproduce each individual memory read, as above, the record component 106a can instead record (i) the data that is brought into the cache 603 (i.e., the memory address and the data stored at that address), and (ii) any reads to un-cached memory.

Since the processor 102 can be viewed as a semi- or quasi-closed system, the execution stream within the processor that occurred at record time can be replicated by the replay component 106b using an emulator that emulates the processor and its cache system. The emulator is configured to produce the same results at replay time that occurred during record time, when the emulator is given the same inputs by the replay component 106b that occurred at record time. The emulator need not be a precise CPU emulator—so long as it emulates instruction execution (e.g., their side effects), it need not match timings, pipeline behaviors, etc. of a physical processor. Thus, recording program execution can be reduced to recording (i) a replica of the influx of data into the system (e.g., data brought into the cache 603 based on cache misses, and un-cached reads), (ii) the data directing the replay component 106b how/when to apply to each input at the right time (e.g., using a count of instructions executed), and (iii) data describing the system to be emulated (i.e., the processor 601, including its cache 603). This enables the time-travel debugger 106 to model the processor 102 as a linear execution machine when recording a trace—without needing to record internal parallelism or pipelining of instruction execution within the processor 102, and without needing to preserve a record the particular timing of execution of each instruction within the processor 102.

As a general overview, the hardware cache-based model for tracing a thread begins, similar to the techniques described above, by saving the processor register values into the trace. Additionally, this model begins by ensuring that appropriate portions of the processor cache 603 for the thread is empty. As discussed below, the record component 106a records data imported to the data cache 605, and may also record data imported to the code cache 604. As such, the data cache 605 needs to be cleared at the beginning of a trace, and the code cache 604 need only be cleared if imports to the code cache 604 are being recorded. Then, at least a portion of the code of the thread is brought into the code cache 604 (e.g., by the processor executing a "cache miss" based on a memory address of the requested code and, if imports to the code cache 604 are being recorded, storing the imported cache line in the trace files(s) 108), and the processing unit 602 begins executing the processor instructions in the code cache 604.

When the code performs its first memory operation (e.g., a read or a write to a memory address in the system memory 608), a "cache miss" occurs, since the data cache 605 is empty and thus does not contain a copy of the memory at the address being accessed. As such, the correct portion of system memory 608 is brought into and stored in a cache line in the data cache 605. For example, if the memory operation was addressed to a memory address at location 608a in the system memory 608, the data at memory location 608a is written to a line in the data cache (e.g., location 605a). Since data has been brought into the cache 603, the record component 106a records this data (i.e., the address and the data that address) to the trace file(s) 108.

After this point, future memory accesses either bring new data into the cache (and hence are recorded by the record component 106a into the trace file(s) 108) or are be performed against data that has already been brought into the cache (e.g., they may read from or write to a cache line in the data cache 605). Subsequent reads to data already in the cache do not need to be recorded. Similar to the techniques described above in connection with FIGS. 1-5, the record component 106a need not track writes to data in the cache, since these writes can be reproduced by executing the instructions with the recorded initial state, and by reproducing the side effects of non-deterministic instructions.

Assuming that the replay component 106b has access to the thread's original code, and that the execution was un-interrupted (e.g., there were no exceptions) at record time, then if the replay component 106b starts with an empty cache and the recorded register values, the replay component 106b can emulate execution by the processor 601, including bringing appropriate data into the cache 603 at appropriate times, and reproducing the side effects of non-deterministic instructions at appropriate times.

Thus, like the techniques discussed above in connection with FIGS. 1-5, when recording using this cache-based model the record component 106a still records in the trace file(s) 108 the side effects of non-deterministic instructions that do not have their output determined exclusively by their input values. Additionally, in some embodiments, the record component 106a still chooses a trace memory model and records in the trace file(s) 108 orderable events performed by the thread with a monotonically increasing number that orders these events across threads.

Additionally, as discussed in more detail later, in some embodiments the record component 106a traces changes in flow of control of the thread that cannot be determined by the code of the thread alone. For example, changes in flow of control may occur due to interrupts. These may include, for example, Asynchronous Procedure Calls ("APCs"), calls from kernel mode, etc.

Furthermore, in some embodiments the record component 106a traces only data cache 605 misses, while in other embodiments the record component 106a traces both data cache 605 misses and code cache 604 misses. In particular, if a thread is executing only non-dynamic code, then only cache lines imported into the data cache 605 need to be traced, since all the code that needs to be executed is available at replay time. However, if a thread includes dynamic-code support, then cache lines imported into the code cache 605 also need to be traced.

Still further, in some embodiments the record component 106a traces which instructions perform memory reads from un-cached/un-cacheable memory individually, since there is no cache miss to track these reads. Example of an un-cached/un-cacheable read is a read from a hardware device, or a read from memory that is otherwise considered un-cacheable by the processor 601 and/or operating system. In some embodiments, un-cached reads are recorded by their side effects, instead of by instruction, such as recording a register value containing the value read.

As described herein, the occurrence of some events (e.g., nondeterministic processor instructions, un-cached reads, etc.) are recorded by the record component 106a based recording the side effects of the event (e.g., by recording the values of processor registers after the event). This can be generalized, in that the record component 106a could record the occurrence of virtually any event based on recording its side effects, even though the event may be recordable in some other way (e.g., by memory value read) or may be omitted from the trace altogether (e.g., because it would occur during execution of a process' code when given appropriate state). In some embodiments, some events are recorded by their side-effects even though they may be more efficiently (e.g., in terms of trace file size) be omitted from the trace or be recorded in some other way.

For example, many processors include model-specific registers (MSRs), which generally comprise control registers. For example, in INTEL architectures, MSRs are used for controls related to debugging, program execution tracing, computer performance monitoring, and toggling CPU features. However, accessing these MSRs can be very expensive in terms of the number of processor cycles required to access these registers. In some implementations, MSRs can be tracked like normal processors registers, by recording their initial values at the beginning of a trace and/or at various times during the traces (e.g. at "key frames" in the trace) and then tracking changes in their values during thread execution. However, this can get very costly in terms of the complexity of tracking the changed values, and since the foregoing access penalty (i.e., many processor cycles) must be incurred each time their values are obtained.

Instead, some embodiments track MSRs by their side effects, rather than tracking their values directly. When a MSR is tracked by their side effects, the code that is being traced has already consumed their values and taken the penalty of accessing the MSR itself, and there is no extra penalty taken by the record component 106a to obtain initial MSR values (e.g., at the beginning of the trace and/or at key frames) for purposes of tracing. Additionally, there is no added complexity of recording value changes throughout the trace.

In some alternative embodiments, each MSR may be treated as if it were an empty cache line. Thus, following the cache based tracing techniques described herein, the first read to an MSR is logged similar to a cache miss on a memory location, such that the value of the MSR is logged in the trace the first time the MSR is read by a thread. Then, future reads to the MSR are only logged if the value read is different than the value already stored in the trace.

Figure 7:
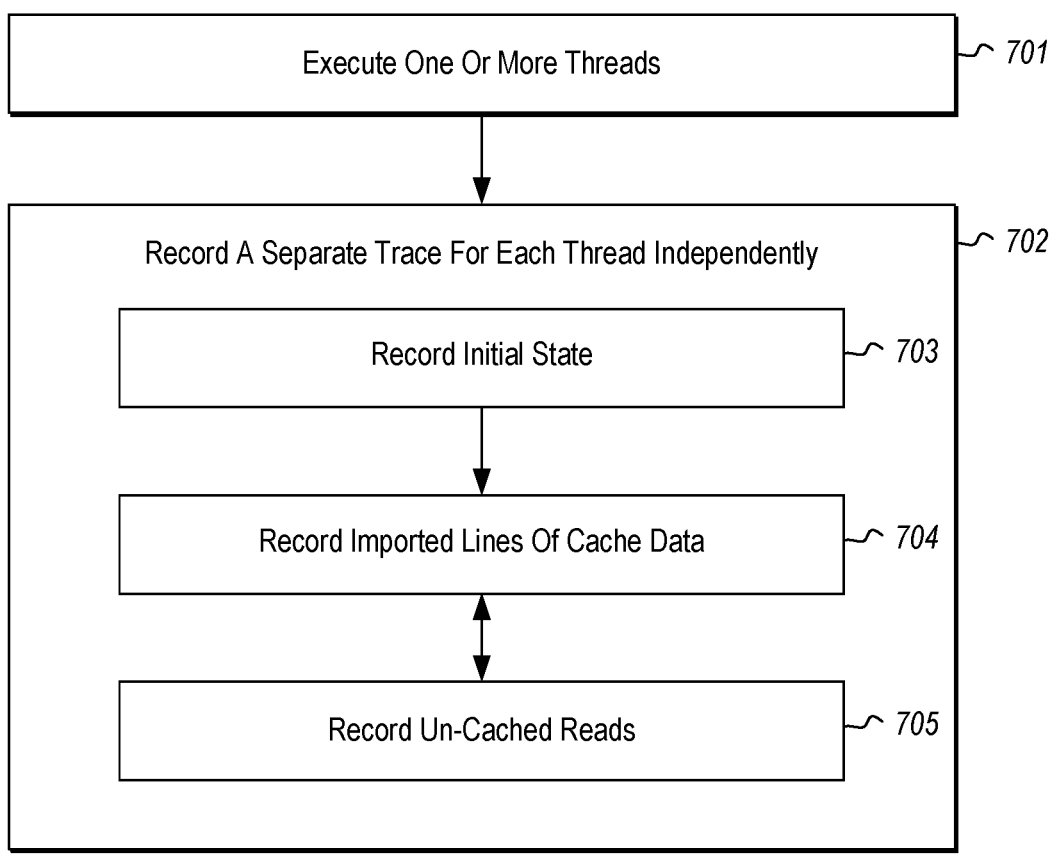
FIG. 7 illustrates a flow chart of an example method for recording a replay-able trace of execution of an executable entity using cache data.

FIG. 7 illustrates a flow chart of an example method 700 for recording a replay-able trace of execution of an executable entity using cache data. As depicted, method 700 includes an act 701 of executing one or more threads concurrently. Act 701 may include executing one or more threads (e.g., user-mode threads, kernel threads, etc.) of an executable entity (e.g., process, kernel, hypervisor, etc.) across one or more processing units of one or more processors, while observing their execution with the record component 106a. For example, act 701 may include executing a first thread on a first processing unit 602 of a processor 601, while potentially executing a second thread on a second processing unit 602 of the same processor 601. As another example, act 701 may include executing two threads on the same processing unit 602 of a processor 601 that supports hyper-threading. As another example, act 710 may include executing two threads on different processing units 602 of different processors 601. Combinations of the foregoing are also possible.

FIG. 7 also depicts that method 700 includes an act 702 of recording a separate trace for each thread independently. Act 702 may include, during execution of the one or more threads, recording a separate replay-able trace for each thread independently. Thus, as illustrated, act 702 may include sub-acts that are performed by the record component 106a for each thread, as they execute.

FIG. 7 also depicts that act 702 includes an act 703 of, for each thread, recording initial state. Act 703 may include recording initial processor register state for the thread. For example, the record component 106a may record the state of registers 607 corresponding to the processing unit 602 upon which the thread is executing. Initial state may also include additional information, such as a snapshot of memory, stack information, the thread's TEB, the process' PEB, etc.

FIG. 7 also depicts that act 702 includes an act 704 of, for each thread, recording imported lines of cache data. Act 704 may include, upon detecting a processor data cache miss based on execution of the thread, recording at least one line of cache data imported into the processor data cache in response to the processor data cache miss. For example, during execution of instructions in the code cache 604, one of those instructions may perform a memory operation on a particular address in the system memory 103 that is not already in the data cache 605. As such, a "cache miss" occurs and the data at that address is imported into the data cache 605 by the processor 601. The record component 106a creates a record of that data in the trace file(s) 108. For example, if the memory address at location 608a is imported to cache line 605a, then the record component 106a records the identity of memory address, and the data it contains, in the trace file(s) 108. If the thread executes dynamic code, then a cache miss may also occur with respect to loading instructions into the processor's code cache 604. As such, act 704 may also include recording at least one line of cache data imported into the processor code cache 640 in response to a processor code cache miss.

FIG. 7 also depicts that act 702 may also include an act 705 of, for each thread, recording un-cached reads. Act 705 may include recording at least one un-cached read based on execution of the thread. For example, during execution of instructions in the code cache 604, one of those instructions may perform a memory read from a memory address of a hardware device, or from a portion of the system memory 608 that is considered un-cacheable. Since there is no cache miss in this situation, the record component 106a records the value read in the trace files(s) 108 in reference to this instruction. For example, the record component 106a may record the side-effects of the un-cached read by recording a register value containing the value read. As illustrated by the double-ended arrows between acts 704 and 705, these acts may occur in any order, and may occur multiple times during tracing of a thread.

As discussed above, some events can be recorded by their side effects. As such, the method 700 may include, during execution of the one or more threads, recording the occurrence of at least one event by at least one of the one or more threads by recording its side effects. For example, the record component 106*a* may record a non-deterministic instruction, an un-cached read, and/or an access to a MSR by its side-effects, though virtually any event can be recorded by its side effects.

As discussed above, the trace file(s) 108 may record when events took place using a variety of techniques (e.g., using instruction counts, CPU cycles, jump taken count together with program counter, memory access, etc.). In some embodiments it may be advantageous to use instruction counts (relative or absolute) to identify when events took place because doing so can remove timing considerations during replay. For example, for purposes of replay it may not matter how long it took the underlying hardware to serve the cache miss at record time; it may only matter that the record component 106*a* records that memory address "X" had value "Y", and that information made it into the cache 603 in time for instruction "Z" to be handled. This can significantly simplify what it takes for the replay component 106*b* to replay the trace with precision, since there is no need to produce accurate timings. This approach also offers a choice of including into the trace file(s) 108 all of the cache misses, or only those that are actually consumed by the processing units 602. Thus, for example, speculative reads from the system memory 103 by the processing units 602 as part of trying to anticipate the next instructions that will be executed don't need to be traced. However, as mentioned above, in other embodiments the record component 106*a* may record timing information in the trace file(s) 108. Doing so can enable the replay component 106*b* to expose this timing at replay time, if desired.

Notably, if the trace file(s) 108 map every cache entry to the instruction that caused it to be brought into the processor 601, the trace file(s) 108 do not need to capture any information when a cache line is evicted from the cache 603 back to the system memory 608. This is because if the thread's code ever needs this data from system memory 608 again, it will be re-imported by the processor 601 into the cache 603 at that time. In this situation, the record component 106*a* can record this re-importing of the data as a new entry into the trace file(s) 108.

As mentioned previously, in some embodiments the record component 106*a* traces changes in flow of control of the thread that cannot be determined by the code of the thread alone. For example, when recording user mode code there may be extra inputs to trace, since the operating system kernel can interrupt the user mode code and thus become an external source of data. For example, when some types of exceptions happen they are handled by the kernel first, and then eventually the control is returned into user mode—that discontinuity is an input into the system. Additionally, when a kernel call is made that doesn't "return" to the instruction after the system call, this is also a discontinuity into the system. Furthermore, when the kernel changes processor registers before returning control to the user mode code, that is also input into the system. Thus, the record component 106*a* creates a record of these discontinuities in the trace files(s) 108, so that the replay component 106*b* can reproduce their side effects at replay time. Similarly, when recording kernel mode code (e.g., with a hypervisor) other external inputs (e.g., traps, interrupts, etc.) may occur, and the record component 106*a* can create a record of these discontinuities in the trace file(s).

In some embodiments, these discontinuities are recorded in the trace file(s) 108 as an influx of information. The particular manner for recording these discontinuities can vary, so long as the trace file(s) 108 contain all of the inputs into the code being recorded to account for the discontinuities. For example, when returning to user mode from kernel mode (e.g., when user mode code is being recorded) the trace files(s) 108 could contain the set of registers that have been changed by the kernel (or all registers). In another example, the trace file(s) include the identity of a continuation instruction's address after a system call. In yet another example, the record component 106*a* could flush the processor cache 603 when returning to user mode, log all valid cache entries, and/or log the entries only if/when they are used. Similarly, when recording kernel mode code, the trace file(s) can include a record of the continuation instruction after a trap/interrupt, any changes made by the trap/interrupt, etc.

In some embodiments, the record component 106*a* and replay component 106*b* are configured to trace and emulate the Translation Lookaside Buffer ("TLB") of a processor, such as TLB 606 in FIG. 6. In particular, it is noted that processor caches 603 are sometimes based on memory physical address of the system memory 608, while code often references memory virtual addresses that are presented by the kernel as an abstraction to threads/processes. Entries (e.g., 606*a*-606*n*) in the TLB 606 store some recent translations between virtual addresses and physical addresses. Thus, in some embodiments, the record component 106*a* records each new entry in TLB 606 into the trace files(s), which provides all of the data needed for the replay component 106*b* to perform the translation at replay time. As with data cache 605, the record component 106*a* need not records any evictions from the TLB 606.

Tracing the TLB 606 entries also provides several other benefits. For example, the TLB 606 enables the record component 106*a* to know which memory pages are un-cached or un-available, so that reads to these pages can be logged (e.g., act 706). Also, the TLB 606 enables the record component 106*a* to account for situations in which two (or more) virtual addresses map to the same physical address. For example, if the cache 603 evicts a physical address entry based on first virtual address, and then the thread accesses an overlapping physical address via a different virtual address, the record component 106*a* use the TLB 606 to determine that it needs to log the access as part of a cache miss.

Some embodiments include a hardware-assisted model that can further reduce the performance impact of cache-based tracing. As indicated earlier, recording a trace begins with an empty cache 603 (and thus the cache 603 is flushed). Furthermore, if there are changes in flow of control (e.g., due to interrupts), then the cache 603 may also be flushed as part of a transition from non-recording (e.g., while in kernel mode) to recording (e.g., when execution has transitioned back to user mode). However, it is noted that flushing the processor cache 603 can be computationally expensive. Thus, embodiments include a hardware modification to the processor 601 that can prevent the need to flush the cache 603 every time the processor 601 transitions from non-recording to recording. These examples reference setting/clearing bits. It will be appreciated that, depending on the implementation, a bit may be considered to be "set" with either a one or a zero, and be "cleared" by toggling it to the opposite value.

Some embodiments extend each cache line entry (e.g., 604*a*-604*n* of the code cache 604 and/or 605*a*-605*n* of the data cache 605) with one or more additional bits that can be used to signal status of the cache line. For example, one bit may be set (e.g., to one) to indicate that the cache line has already been recorded into the trace file(s) 108. Then, instead of flushing the cache on a transition, the processor 601 only needs to toggle (e.g., to zero) these bits on the cache lines. Later, if the thread's code consumes a cache line with the bit not set, then the entry needs to be stored into the trace, as if it was a cache miss. Setting and unsetting this bit also enables the record component 106a to refrain from tracing any speculative memory accesses made by the processor 601 until it knows that the thread's code has indeed consumed those accesses.

One or more bits that signal status of each cache line may be usable in other ways as well. For example, suppose the record component 106a is recording user mode code, and such code calls into the kernel to then come back into user mode. In this situation, instead of clearing each cache line bit when the processor 601 returns to user mode, the processor 601 could instead clear the bit only on the cache lines that the kernel mode code modified—and leave the bit set on any cache lines that were unmodified. This further reduces the amount of entries the record component 106a needs to add to the trace file(s) 108 when returning from the kernel. However, this technique may not apply to all kernel- to user-mode transitions. For example, if the kernel just switched from a thread on another process into a thread we are recording, the bit should be cleared across all cache entries.

Notably, the foregoing concepts are usable in environments in which hyper-threading is used (i.e., multiple hardware threads are executed on the same processing unit/core). Many processors have exclusive caches for each core (e.g., each core may have its own layer-1 and layer-2 cache), and also provide a shared cache for all the cores (e.g., a layer-3 cache). Thus, when hyper-threading is in use, multiple hardware threads (e.g., "thread 1" and "thread 2") executing on a core share the same exclusive cache (e.g., layer-1, layer 2) for that core, so the processor tags each cache line used by these threads with which thread it is associated with.

In some embodiments, one or more bits may be added to each cache line in the shared cache which signal whether the cache line has actually been modified by a thread. For example, suppose that "thread 1" is being traced and execution switches to "thread 2" on the same core. If "thread 2" accesses a cache line in that core's exclusive cache that was assigned to "thread 1," a bit may be toggled only if "thread 2" has modified the cache line. Then, when execution switches back to "thread 1" and "thread 1" accesses this same cache line, this line need not be recorded to the trace if "thread 2" did not toggle the bit—since the contents of the cache line has not changed since "thread 1" last accessed it. The foregoing may also be applied to shared caches. For example, each cache line in layer-3 cache could include a bit for each thread it services, which indicates whether the thread has already "recorded" the current value in the cache line. For example, each thread may set its bit to one when consuming the line, and sets all other values to zero when writing to the line.

In some embodiments, the trace file(s) 108 may record entries out-of-order from the order they executed at record time. For example, suppose that entries are recorded based on the number of instructions since the last discontinuity (including kernel call) in a thread. In this situation, the entries between two discontinuities could be re-ordered without loss of information. In some embodiments, doing so may enable faster recording, since optimizations to memory access by be made by the processor. For example, if a processor executes a sequence of instructions (e.g., A, B, and C) that result in an entry to the trace file(s) 108, but that have no dependencies between them, then the order in which they are executed is irrelevant at replay time. If instruction A access data that is not already in the cache 603, then the processor 601 accesses system memory 608 at the cost of many processor cycles; but instructions B and C access data already in the cache 603, then they can be executed quickly. However, if instructions are required to be recorded in-order in the trace file(s) 108, the record of execution of instructions B and C must be held (e.g., in memory resources of the processors) until execution of the instruction A has finished. By contrast, if instructions are permitted to be recorded out-of-order, then instructions B and C can be written to the trace file(s) 108 prior to the completion of instruction A, freeing up those resources.

Accordingly, the foregoing embodiments provide new techniques for recording and replaying traces for time travel debugging that produce orders-of-magnitude performance improvements over prior attempts, that enable recording of multi-threaded programs whose threads freely run concurrently across multiple processing units, and that produce trace files with orders of magnitude size reduction over the trace files of prior attempts, among other things. Such improvements greatly reduce the amount of computing resources (e.g., memory, processer time, storage space) needed to trace and replay software. As such, the embodiments herein are usable in real-world production environments, which greatly enhances the availability and utility of time travel debugging.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A processor comprising a plurality of registers including at least one general register and at least one model-specific register, and a processor cache, the processor configured to:
   initiate recording a trace of execution of an execution entity, including recording initial processor register state for the execution entity into the trace, the recorded initial processor register state including a value of at least one register of the plurality of registers;
   based on detection of a cache miss during the execution of the execution entity subsequent to the recording of the initial processor register state for the execution entity into the trace,
      record an influx of data imported into the processor cache in response to the cache miss; and
      set a hardware bit on a cache line of the processor cache storing the influx of data, the hardware bit indicating that the cache line has been recorded into the trace; and
   based on execution of a non-deterministic processor instruction of the execution entity subsequent to the recording of the initial processor register state for the execution entity into the trace, record at least one side effect of an access to the at least one model-specific register, including recording a change in the value of the at least one register of the plurality of registers, the change resulting from the execution of the non-deterministic processor instruction of the execution entity.

2. The processor of claim 1, the processor also configured to record a result of an un-cached read resulting from execution of the execution entity.

3. The processor of claim 1, the processor also configured to clear the hardware bit based on occurrence of an event selected from the group consisting of:
- a first event comprising a transition of the processor from a non-recording state to a recording state;
- a second event comprising a first modification of the cache line; and
- a third event comprising an interrupt to the execution of the execution entity.

4. The processor of claim 1, wherein the hardware bit is cleared subsequent to setting the hardware bit, the processor also being configured to, based on consumption of the cache line after the hardware bit is cleared, set the hardware bit to indicate that the cache line again has been recorded into the trace.

5. A system comprising the processor of claim 1, the system further comprising a computer-readable storage medium having stored thereon instructions that are executable at the system to request the processor to clear the hardware bit based on an execution transition selected from the group consisting of:
- a first execution transition from kernel-mode to user-mode; and
- a second execution transition from a second execution entity to the execution entity.

6. A system comprising the processor of claim 1, the system further comprising a computer-readable storage medium having stored thereon instructions that are executable at the system to request the processor to transition to a non-recording state based on an execution transition selected from the group consisting of:
- a first execution transition from kernel-mode to user-mode; and
- a second execution transition from the execution entity to a second execution entity.

7. The processor of claim 1, the processor also being configured to record at least a portion of a translation lookaside buffer entry into the trace.

8. The processor of claim 1, the processor also being configured to access the at least one model-specific register based on the execution of the non-deterministic processor instruction of the execution entity subsequent to the recording of the initial processor register state for the execution entity into the trace.

9. The processor of claim 1, wherein the at least one model-specific register comprises a processor-specific control register that controls at least one of a debugging feature, a program execution tracing feature, or a performance monitoring feature.

10. The processor of claim 1, wherein, based on execution of the non-deterministic processor instruction of the execution entity, the processor also records a memory value changed by the execution of the non-deterministic processor instruction of the execution entity.

11. A method, implemented at a processor comprising a plurality of registers including at least one general register and at least one model-specific register, and a processor cache, the method comprising:
- initiating recording a trace of execution of an execution entity, including recording initial processor register state for the execution entity into the trace, the recorded initial processor register state including a value of at least one register of the plurality of registers;
- based on detection of a cache miss during the execution of the execution entity subsequent to the recording of the initial processor register state for the execution entity into the trace,
  - recording an influx of data imported into the processor cache in response to the cache miss; and
  - setting a hardware bit on a cache line of the processor cache storing the influx of data, the hardware bit indicating that the cache line has been recorded into the trace; and
- based on execution of a non-deterministic processor instruction of the execution entity subsequent to the recording of the initial processor register state for the execution entity into the trace, recording at least one side effect of an access to the at least one model-specific register, including recording a change in the value of the at least one register of the plurality of registers, the change resulting from the execution of the non-deterministic processor instruction of the execution entity.

12. The method of claim 11, further comprising recording a result of an un-cached read resulting from execution of the execution entity.

13. The method of claim 11, further comprising clearing the hardware bit based on occurrence of an event selected from the group consisting of:
- a first event comprising a transition of the processor from a non-recording state to a recording state;
- a second event comprising a first modification of the cache line; and
- a third event comprising an interrupt to the execution of the execution entity.

14. The method of claim 11, wherein the hardware bit is cleared subsequent to setting the hardware bit, the method further comprising, based on consumption of the cache line after the hardware bit is cleared, setting the hardware bit to indicate that the cache line again has been recorded into the trace.

15. The method of claim 11, further comprising clearing the hardware bit based on an execution transition selected from the group consisting of:
- a first execution transition from kernel-mode to user-mode; and
- a second execution transition from a second execution entity to the execution entity.

16. The method of claim 11, further comprising transitioning to a non-recording state based on an execution transition selected from the group consisting of:
- a first execution transition from kernel-mode to user-mode; and
- a second execution transition from the execution entity to a second execution entity.

17. The method of claim 11, further comprising recording at least a portion of a translation lookaside buffer entry into the trace.

18. The method of claim 11, wherein the at least one model-specific register comprises a processor-specific control register that controls at least one of a debugging feature, a program execution tracing feature, or a performance monitoring feature.

* * * * *